(12) United States Patent
Sun et al.

(10) Patent No.: US 9,037,091 B2
(45) Date of Patent: May 19, 2015

(54) TRANSMISSION OF CHANNEL QUALITY DATA IN WIRELESS COMMUNICATION SYSTEMS

(75) Inventors: Hongmei Sun, Beijing (CN); Changlong Xu, Beijing (CN); Qinghua Li, San Ramon, CA (US); Yuan Zhu, Beijing (CN); Rath Vannithamby, Portland, OR (US); Jong-Kae J. K. Fwu, Sunnyvale, CA (US); Senjie Zhang, Beijing (CN); Yang Y. Gao, Beijing (CN); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 12/645,830

(22) Filed: Dec. 23, 2009

(65) Prior Publication Data

US 2010/0227565 A1    Sep. 9, 2010

Related U.S. Application Data

(60) Provisional application No. 61/156,882, filed on Mar. 3, 2009.

(51) Int. Cl.
*H04B 17/00* (2006.01)
*H04W 68/08* (2009.01)

(52) U.S. Cl.
CPC ..................................... *H04W 68/08* (2013.01)

(58) Field of Classification Search
CPC ........ H04B 1/18; H04B 1/406; H03D 7/1441; H04W 16/10; H04W 28/16; H04W 16/14; H04L 1/0026

USPC ............... 375/246, 253, 252, 240.23, 240.24, 375/358; 455/67.11, 130, 450, 522, 572; 370/329, 338, 348, 349

See application file for complete search history.

(56) References Cited

U.S. PATENT DOCUMENTS 6,330,462 B1 * 12/2001 Chen .............................. 455/572
7,881,722 B2 * 2/2011 Gunnarsson et al. .......... 455/450
(Continued)

FOREIGN PATENT DOCUMENTS

CN      101361288 A      2/2009
JP      2003-198651 A    7/2003
(Continued)

OTHER PUBLICATIONS

Srinivasan, et al., "Proposed Text for the Draft P802 .16m Amendment on the PHY Structure for UL Control", IEEE C802.16m-09/0198, Jan. 7, 2009, 9 Pages.

(Continued)

*Primary Examiner* — Wesley Kim
*Assistant Examiner* — Md Talukder
(74) *Attorney, Agent, or Firm* — Alpine Technology Law Group LLC

(57) ABSTRACT

Briefly, in accordance with one or more embodiments, data transmitted from a transmitter is received in a downlink channel, and channel quality data is fed back to the transmitter in a first uplink channel or in a second uplink channel. Channel quality data is feedback at a lower rate on the first uplink channel and channel quality data is feedback at a higher rate on the second uplink channel in the event there is a higher amount of data to be fed back. Link adaptation may be utilized to select a transmission rate on the second uplink channel, wherein the transmission rate is selected based at least in part on a channel condition or a user location.

23 Claims, 10 Drawing Sheets

(56) References Cited

U.S. PATENT DOCUMENTS

| | | | |
|---|---|---|---|
| 7,970,001 B2* | 6/2011 | Hoshino et al. | 370/430 |
| 8,200,165 B2* | 6/2012 | Sun et al. | 455/69 |
| 8,655,270 B2* | 2/2014 | Laufer | 455/13.4 |
| 2003/0123470 A1* | 7/2003 | Kim et al. | 370/437 |
| 2004/0203383 A1 | 10/2004 | Kelton et al. | 455/41.2 |
| 2006/0146856 A1* | 7/2006 | Jung et al. | 370/431 |
| 2007/0026808 A1* | 2/2007 | Love et al. | 455/67.7 |
| 2007/0287476 A1* | 12/2007 | Jeong et al. | 455/456.6 |
| 2008/0019455 A1* | 1/2008 | Kim et al. | 375/260 |
| 2008/0081655 A1* | 4/2008 | Shin et al. | 455/522 |
| 2008/0085223 A1* | 4/2008 | Jung et al. | 422/105 |
| 2008/0095223 A1* | 4/2008 | Tong et al. | 375/228 |
| 2008/0242308 A1* | 10/2008 | Gunnarsson et al. | 455/450 |
| 2008/0298306 A1* | 12/2008 | Larsson | 370/328 |
| 2009/0149140 A1* | 6/2009 | Borran et al. | 455/114.2 |
| 2009/0185502 A1* | 7/2009 | Sung et al. | 370/252 |
| 2010/0002596 A1* | 1/2010 | Wu | 370/252 |
| 2010/0105402 A1* | 4/2010 | Chun et al. | 455/450 |
| 2010/0222008 A1* | 9/2010 | Astely et al. | 455/67.11 |
| 2010/0226443 A1* | 9/2010 | Citta et al. | 375/240.26 |
| 2010/0227565 A1* | 9/2010 | Sun et al. | 455/67.11 |
| 2010/0272047 A1* | 10/2010 | Zhu et al. | 370/329 |
| 2010/0329316 A1* | 12/2010 | Sun et al. | 375/221 |
| 2011/0116432 A1* | 5/2011 | Doppler et al. | 370/312 |
| 2013/0322359 A1* | 12/2013 | Hunsaker et al. | 370/329 |

FOREIGN PATENT DOCUMENTS

| | | |
|---|---|---|
| JP | 2008-035158 A | 2/2008 |
| JP | 2008-048319 A | 2/2008 |
| JP | 2008-300995 A | 12/2008 |
| KR | 10-2005-0109566 A | 11/2005 |
| WO | 2008/135842 A2 | 11/2008 |
| WO | 2008/143423 A1 | 11/2008 |
| WO | 2010/101805 A2 | 9/2010 |
| WO | 2010/101805 A3 | 10/2010 |

OTHER PUBLICATIONS

Srinivasan, et al., "Cross Evaluation of Proposed PHY Structures for the IEEE 802.16m UL Primary and Secondary Fast Feedback Channels", IEEE C802.16m-09/0125, Jan. 5, 2009, pp. 26-27, 28 Pages.

Hongmei, S. et al., "Proposal to IEEE 802.16m CQI Feedback Channel Design", IEEE C80216m-08/937r 2, Sep. 5, 2008, pp. 4-5, 7 &13-14, 21 Pages.

Jinyoung, C. et al., "Proposed Text of UL Fast Feedback Channel Sections for the IEEE 802.16m Amendment", IEEE C802.16m-0910289, Jan. 7, 2009, pp. 3-6 & 8.

International Search Report and Written Opinion Received for PCT Patent Application No. PCT/US2010/025726, Mailed on Aug. 31, 2010, 10 pages.

International Preliminary Report on Patentability Received for PCT Patent Application No. PCT/US2010/025726, Mailed on Sep. 15, 2011, 7 pages.

Office Action received for Korean Patent Application No. 10-2011-7020640, mailed on Mar. 27, 2013, 3 Pages of Office Action and 3 Pages of English Translation.

Office Action received for Japanese Patent Application No. 2011-552216, mailed on Apr. 2, 2013, 2 Pages of Office Action and 2 Pages of English Translation.

Yoshio et al., "A Study on Maximum Doppler Frequency Estimation for OFDM Systems", IEICE Technical Report, vol. 108, No. 334, Nov. 27, 2008, pp. 85-89 (English Abstract Only).

Office Action received for Korean Patent Application No. 10-2011-7020640, mailed on May 13, 2013, 3 Pages of Office Action and 2 Pages of English Translation.

Office Action received for Chinese Patent Application 201080010788.4, mailed on Aug. 6, 2013, 9 pages of Office Action and 16 pages of English translation.

Office Action Received for Korea Patent Application No. 10-2011-7020640, Mailed on Sep. 6, 2012, 6 pages of Office Action and 5 pages of English Translation.

Office Action Received for Japanese Patent Application 2011-552216, mailed on Oct. 29, 2013, 2 pages of Office Action and 2 pages of English Translation.

Rath, et al., "Proposal for IEEE 802.16m CQI Feedback Channel Framework", IEEE C80216m-08/936r1, Sep. 5, 2008, 4 pages.

Sampei, S., "Adaptive Modulation Techniques for High-Speed Wireless Data Transmission", Journal of IEICE, vol. 85, No. 4, Apr. 2002, 9 Pages.

Notice of Allowance received for Japanese Patent Application No. 2011-552216, mailed on Apr. 8, 2014, 3 pages of Notice of allowance including 1 page of Partial English Translation.

Office Action received for Chinese Patent Application No. 201080010788.4, mailed on Feb. 8, 2014, 8 pages of Office action including 2 pages of English Translation.

Final Rejection received for Korean Patent Application No. 10-2011-7020640, mailed on Sep. 19, 2014, 16 Pages of Final Rejection and 3 Pages of Summary Translation.

* cited by examiner

US 9,037,091 B2

TRANSMISSION OF CHANNEL QUALITY DATA IN WIRELESS COMMUNICATION SYSTEMS

CROSS-REFERENCE TO RELATED APPLICATIONS

The present application claims the benefit of U.S. Provisional Application No. 61/156,882 filed Mar. 3, 2009. Said Application No. 61/156,882 is hereby incorporated herein by reference in its entirety.

BACKGROUND

In wireless communication systems, downlink (DL) transmissions such as from a base station (BS) to a mobile station (MS) or subscriber station (SS) may support multiple transmission modes. Performance of the downlink transmissions may be optimized to achieve a specified capacity target by adaptively switching among the multiple transmission modes according the channel of the mobile station and traffic conditions. A feedback channel may be utilized to feed back data relating to a channel quality indicator (CQI) and or other feedback such as information relating to a multiple-input, multiple-output (MIMO) system to support downlink adaptation. In order to optimize overall performance, the feedback channel may be involved in feeding back an appropriate metric for downlink adaptation, reduce feedback latency to allow for robust operation at higher speeds, control feedback to manage uplink efficiency, and/or control feedback reliability to allow downlink optimization.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
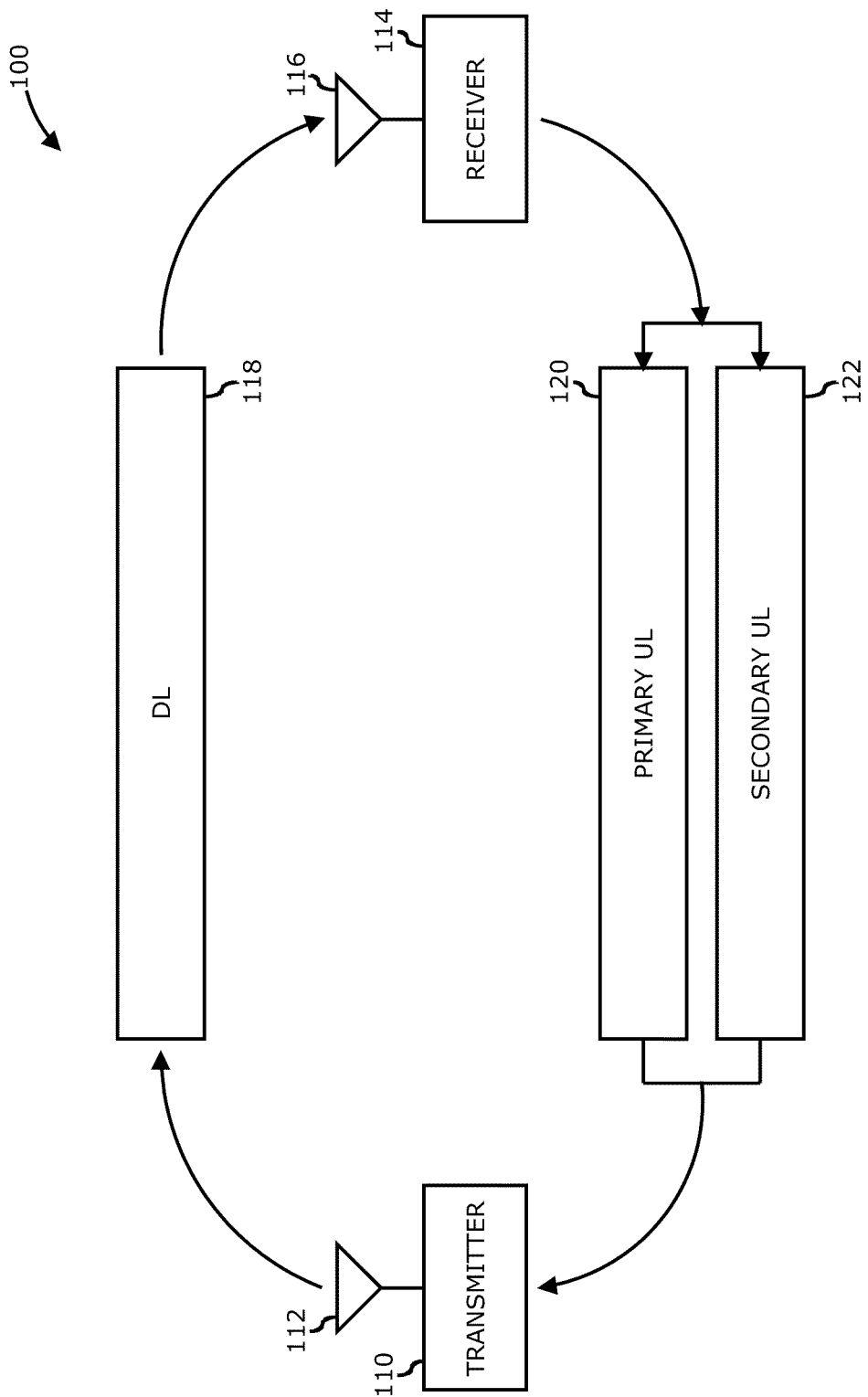
FIG. 1 is a block diagram of a channel quality feedback system for a wireless network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a channel quality feedback system for a wireless network in accordance with one or more embodiments will be discussed. As shown in FIG. 1, a channel quality feedback system 100 may comprise a transmitter 110 having one or more antennas 112 communicating with a receiver 114 having one or more antennas 116. In one or more embodiments, transmitter 110 may transmit data packets via a downlink (DL) channel 118 to receiver 114. Feedback may be provided from receiver 114 to transmitter 110 in a feedback arrangement comprising a two-level adaptive feedback framework comprising a primary uplink (UL) fast feedback channel 120 and a secondary uplink fast feedback channel 122. Primary UL feedback channel 120 may provide wideband channel quality indicator (CQI) reports with robust data rate from receiver 114 to transmitter regarding downlink channel 118. Secondary UL feedback channel 122 may provide sub-band CQI reports from receiver 114 to transmitter 110 using an adaptive transmission rate. Secondary UL fast feedback channel 122 may utilize link adaptation with event-driven transmission in order to enhance the transmission efficiency with a reduced overhead. Such a two-channel quality feedback system 100 as shown in FIG. 1 provides flexibility for an independent fast feedback channel design in order to optimize the performance of each channel. For example, the two-channel feedback system may achieve an optimal or a nearly optimal performance under different permutation modes, although the scope of the claimed subject matter is not limited in this respect.

In one or more embodiments, primary UL feedback channel 120 may be referred to a primary CQI channel (PCQICH) and secondary feedback channel 122 may be referred to as a secondary CQI channel (SCQICH). Optimized BCH codes may be utilized used for both primary (PCQICH) fast feedback channel 120 and/or secondary (SCQICH) fast feedback channel 122 having a relatively simplified design and reduced complexity in order to fit the feedback information into different tile sizes. In one or more embodiments, primary fast feedback channel 120 may utilize semi-orthogonal sequences, for example of length 12, to support up to 6 information bits with optimized performance, and furthermore may utilize larger diversity order. Proposed detail tile size and pilot pattern and receiver detection method for fast feedback channel design, which can take advantage of both coding gain and frequency diversity gain. Receiver 114 may utilize a non-coherent design to support fast feedback channel transmission with non-coherent detection in high speeds such as when speed is larger than 120 kilometers per hour (kmph), although the scope of the claimed subject matter is not limited in this respect.

In one or more embodiments, primary CQI channel 120 may support lower rate, less frequent, periodic CQI feedback transmission from receiver 114 to transmitter 110. Primary CQI channel 120 may transmit average CQI and/or multiple-input, multiple-output (MIMO) feedback information and to provide reliable basic connections from receiver 114 to transmitter 110. Primary CQI channel 120 may be available to all users who need to feedback CQI in the uplink. For example, where transmitter 110 is a base station (BS) or base transceiver station, for example as shown in and described with respect to FIG. 2, below, the base station may allocate resources for primary fast feedback channel 120 and specify the feedback frequency based on the channel variation characteristics for each individual user, referred to as a subscriber station or mobile station, embodied as receiver 114. The resource allocation information may be sent to the subscriber station to regulate its CQI feedback behavior.

In one or more embodiments, the secondary fast feedback channel 122 may support more advanced features than the primary fast feedback channel 120, for example multiple-input, multiple-output (MIMO), fractional frequency reuse (FFR), frequency selective scheduling (FSS), and so on, with greater efficiency and is used when there is data to be transmitted. Furthermore, secondary fast feedback channel 122 may provide CQI feedback more frequently and/or with finer granularity than primary fast feedback channel 120. That is, secondary fast feedback channel 122 may support a higher payload feedback of narrow band CQI and MIMO feedback information, which may include MIMO effective signal-to-interference and noise ratio (SINR) per codeword, transmission rank, and pre-coding matrix index (PMI), and so on, on demand, and the transmission may be event driven. To ensure robust transmission while maximizing throughput of secondary fast feedback channel 122, link adaptation may be utilized on secondary fast feedback channel 122, and which may be utilized based at least in part on user location and/or channel condition to increase feedback efficiency. In such an arrangement, center users may take advantage of their relatively higher SINR and transmit CQIs at higher rates with an increased efficiency. As a result, secondary fast feedback channel 122 may cover users with localized resource allocation via downlink channel 118 that involves feeding back more CQI to support features such as FSS, MIMO, and so on, while users with very poor channel quality may not achieve meaningful gain feeding back more CQI using secondary fast feedback channel 122. Per a request from a subscriber station, the base station may decide whether to allocate secondary fast feedback channel 122, when to allocate secondary fast feedback channel 122, the amount of resources involved and the corresponding index, transmission frequency, rate, and so on, and relay such information to the subscriber station. Further details of channel quality feedback system 100 are discussed, below. An example network implementing channel quality feedback system 100 is shown in and described with respect to FIG. 2, below.

Figure 2:
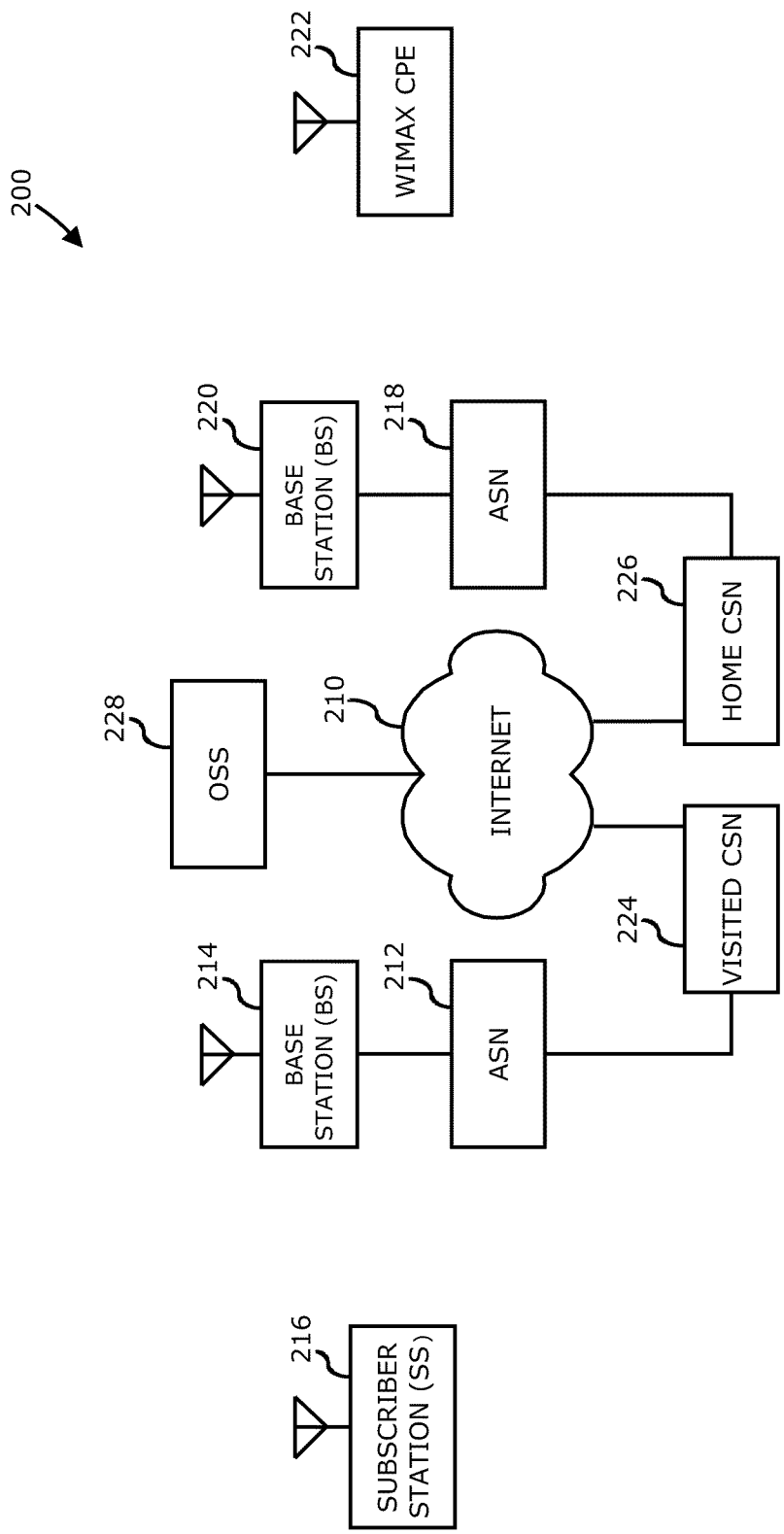
FIG. 2 is a block diagram of a wireless wide area network utilizing a channel quality feedback system in accordance with one or more embodiments.

Referring now to FIG. 2, a block diagram of a wireless wide area network utilizing a channel quality feedback system in accordance with one or more embodiments will be discussed. As shown in FIG. 2, network 200 may be an internet protocol (IP) type network comprising an internet 210 type network or the like that is capable of supporting mobile wireless access and/or fixed wireless access to internet 210. In one or more embodiments, network 200 may be in compliance with a Worldwide Interoperability for Microwave Access (WiMAX) standard or future generations of WiMAX, and in one particular embodiment may be in compliance with an Institute for Electrical and Electronics Engineers 802.16m standard (IEEE 802.16m). In one or more alternative embodiments network 200 may be in compliance with a Third Generation Partnership Project Long Term Evolution (3GPP LTE) or a 3GPP2 Air Interface Evolution (3GPP2 AIE) standard, a Fourth Generation (4G) wireless network, and on. In general, network 200 may comprise any type of orthogonal frequency division multiple access (OFDMA) based wireless network, and the scope of the claimed subject matter is not limited in these respects. As an example of mobile wireless access, access service network (ASN) 212 is capable of coupling with base station (BS) 214 to provide wireless communication between subscriber station (SS) 216 and internet 210. Base station 214 may tangibly embody transmitter 110 and subscriber station 114 of FIG. 1, although the scope of the claimed subject matter is not limited in this respect. Subscriber station 216 may comprise a mobile type device or information handling system capable of wirelessly communicating via network 200, for example a notebook type computer, netbook computer, a cellular telephone, a personal digital assistant, smart phone, or the like. ASN 212 may implement profiles that are capable of defining the mapping of network functions to one or more physical entities on network 100. Base station 114 may comprise radio equipment to provide radio-frequency (RF) communication with subscriber station 216, and may comprise, for example, the physical layer (PHY) and media access control (MAC) layer equipment in compliance with an IEEE 802.16m type standard. Base station 214 may further comprise an IP backplane to couple to internet 210 via ASN 212, although the scope of the claimed subject matter is not limited in these respects.

Network 200 may further comprise a visited connectivity service network (CSN) 224 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or interne protocol (IP) type server functions, or the like. However, these are merely example of the types of functions that are capable of being provided by visited CSN or home CSN 226, and the scope of the claimed subject matter is not limited in these respects. Visited CSN 224 may be referred to as a visited CSN in the case for example where visited CSN 224 is not part of the regular service provider of subscriber station 216, for example where subscriber station 116 is roaming away from its home CSN such as home CSN 226, or for example where network 200 is part of the regular service provider of subscriber station but where network 200 may be in another location or state that is not the main or home location of subscriber station 216. In a fixed wireless arrangement, WiMAX type customer premises equipment (CPE) 222 may be located in a home or business to provide home or business customer broadband access to interne 210 via base station 220, ASN 218, and home CSN 226 in a manner similar to access by subscriber station 216 via base station 214, ASN 212, and visited CSN 224, a difference being that WiMAX CPE 222 is generally disposed in a stationary location, although it may be moved to different locations as needed, whereas subscriber station may be utilized at one or more locations if subscriber station 216 is within range of base station 214 for example. In accordance with one or more embodiments, operation support system (OSS) 228 may be part of network 200 to provide management functions for network 200 and to provide interfaces between functional entities of network 200. Network 200 of FIG. 2 is merely one type of wireless network showing a certain number of the components of network 200, however the scope of the claimed subject matter is not limited in these respects.

Figure 3:
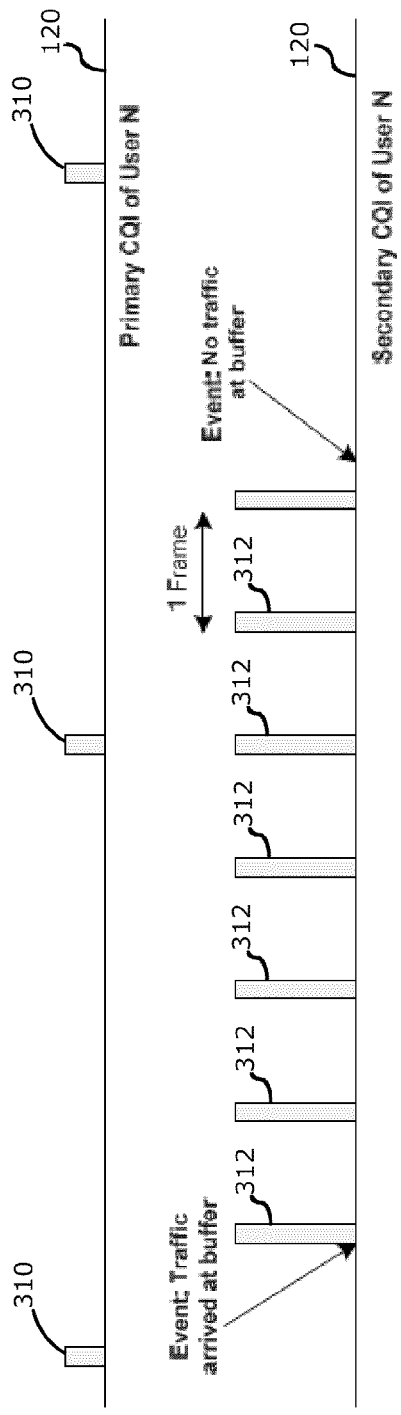
FIG. 3 is a diagram showing an example of periodicity and frequency of primary and secondary fast feedback channels in time domain in accordance with one or more embodiments.

Referring now to FIG. 3, a diagram showing an example of periodicity and frequency of primary and secondary fast feedback channels in time domain in accordance with one or more embodiments will be discussed. As shown in FIG. 3, primary fast feedback channel 120 is capable of supporting each N number of users to feedback CQIs periodically in multiple of frames 310. Feedback CQIs for the N number of users feed on secondary fast feedback control channel 122 may be more frequent than that on primary fast feedback control channel 120. The allocation for secondary fast feedback channel 122 may be event driven depending on the traffic condition and/or channel variation for a given user. The uplink secondary fast feedback channel 122 may be allocated only if there is traffic in the buffer or expected arrive within the next n number of frames 312 and turned off when there is no traffic in the buffer and not expected to arrive within the next m number of frames. Additionally, primary fast feedback channel 120 is capable of providing a reference for power control. This reference may be utilized for power controlling both for the data channel and secondary fast feedback channel 122. Secondary fast feedback channel 122 may involve uplink power control to help the user equipment (UE) to achieve a minimum SINR so that a lowest or nearly lowest modulation coding scheme (MCS) level may be supported.

In one or more embodiments, multiple ways to support link adaptations on secondary fast feedback channel 122 may be utilized. In a first embodiment, link adaptation may be based on longer term channel statistics such as uplink geometry SINR measured over a longer term at the transmitter 110 embodied as base station 214. In another embodiment, receiver 114 embodied as subscriber station 216 may start to transmit using the lowest or nearly lowest modulation. Transmitter 110 embodied as base station 214 may tune the rate based at least in part on channel measurement using an uplink dedicated pilot of the secondary fast feedback channel 122 once subscriber station 216 gets allocated and starts to feed back CQI on secondary fast feedback channel 122. In yet another embodiment, primary fast feedback channel 120 may provide dedicated pilots to facilitate channel measurement for one or more of the users. For users that utilize secondary fast feedback channel 122, an initial modulation and coding scheme (MCS) level may be selected based on channel quality measured by primary fast feedback channel 120, and the rate of each of the users may be turned in similar way as with the previous embodiment. In yet a further embodiment, an adaptive rate may be based at least in part on dedicated pilots of candidate and/or sounding subchannels.

In one or more embodiments, transmitter 110 embodied as base station 214 may allocate candidate channels to users requesting to transmit CQI in secondary fast feedback channel 122. The channel qualities of the candidate subchannels for one or more of the users are measured by dedicated pilots. In terms of the qualities, the corresponding modulation and coding schemes (MCSs) of secondary fast feedback channel 122 may be allocated in the specified subchannel for selected users. In the following frame, the CQI data are transmitted in the allocated subchannels.

For the above embodiments, link adaptation may be coarse in the sense that a certain amount of margin is maintained to compensate the uplink indeterminable channel variation and interference. In accordance with one or more embodiments, the block codes based on unified coding may support up to 12 or 24 information bits as described in further detail, below, based at least in part on a specific tile structure such as a 3×6 structure, 6×6 structure, or a 2×6 structure, although the selected approach is capable of adapting to different resource block sizes and/or tile structures. Additionally, considering the fact that the total bits per CQI per user may vary depending on, for example, the different MIMO the user chooses, finer granularity levels may be provided via supporting mixed rates and/or MCS levels within one or more resource blocks to optimally utilize the resources. Further details of the feedback structures are discussed, below.

Figure 4:
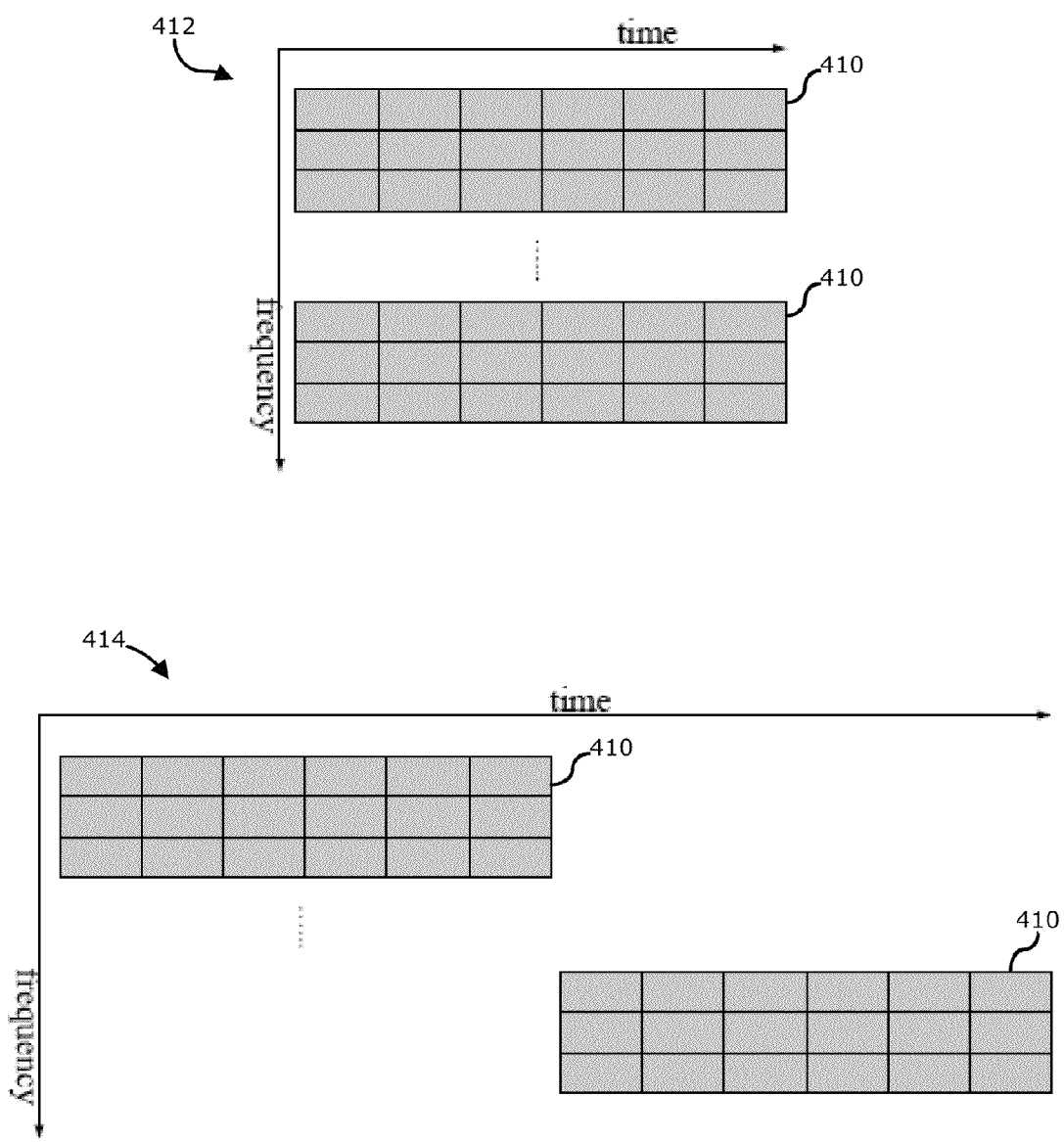
FIG. 4 is a diagram of an example tile structure for a primary fast feedback channel in accordance with one or more embodiments.

Referring now to FIG. 4, a diagram of an example tile structure for a primary fast feedback channel in accordance with one or more embodiments will be discussed. As shown in FIG. 4, a three by six tile structure 410 is shown in a distributed arrangement at graph 412 and a hopping localized arrangement at graph 414. In one or more embodiments, there may be multiple ways to design primary fast feedback channel 120 depending on the fact that the permutation mode of the uplink feedback channel is localized, distributed or hopping localized, wherein the latter two designs may share same tile structure and pilot patterns. In a localized mode, a logical channel primary fast feedback channel 120 may occupies one tile size of six contiguous subcarriers by six orthogonal frequency division multiplexing (OFDM) symbols, referred to as 6×6 tile structure for short, which may be chosen from different uplink localized control resource units to achieve more spreading gain.

In the other two permutation modes, there are two design variations. In a first variation, a logical channel of primary fast feedback channel 120 may occupy two uplink feedback mini-tiles (UL FMT), which may be chosen from different uplink distributed control resource units for frequency diversity. In such an arrangement, each UL FMT may be defined as three contiguous subcarriers by six OFDM symbols, referred to as a 6×6 tile structure for short, as shown in FIG. 4. In a second variation, a logical channel of primary fast feedback channel 120 may occupy three uplink feedback mini-tiles (UL FMT), which may be chosen from different uplink distributed control resource units for frequency diversity. In this arrangement, one or more UL FMT may be defined as two contiguous subcarriers by six OFDM symbols, referred to as a 2×6 tile structure for short), which is similar to a 3×6 tile structure. In one or more embodiments, in all the above three cases, the same block size may be utilized, which is a 6×6 tile structure. An example channel structure for primary fast feedback channel 120 is shown in and described with respect to FIG. 5, below.

Figure 5:
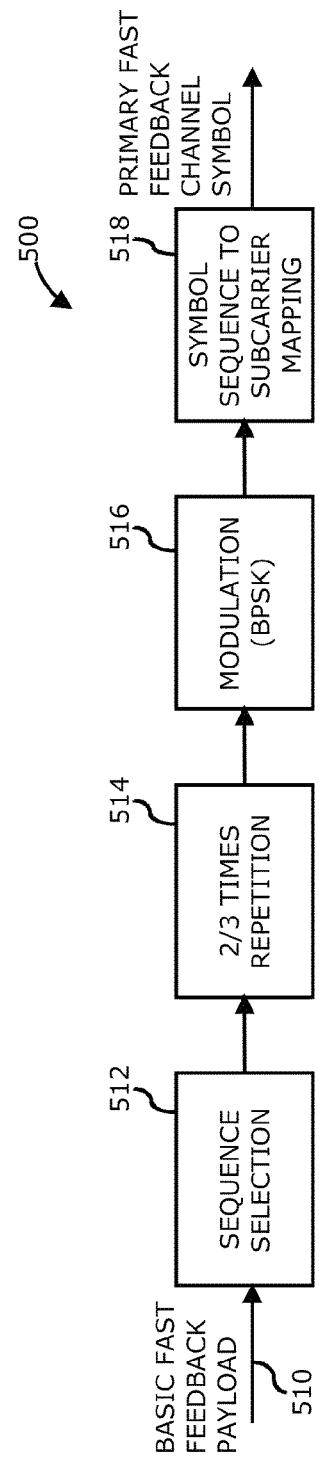
FIG. 5 is a diagram of a channel structure of an uplink primary feedback channel in accordance with one or more embodiments.
Figure 6:
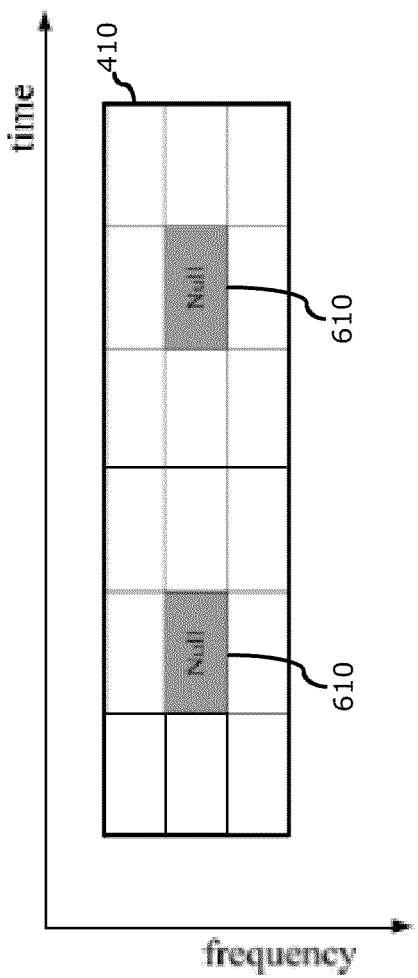
FIG. 6 is a diagram of a tile structure for a primary fast feedback channel in accordance with one or more embodiments.

Referring now FIG. 5 and FIG. 6, a diagram of a channel structure of an uplink primary feedback channel in accordance with one or more embodiments will be discussed. FIG. 5 shows the symbol generation procedure 500 for primary fast feedback channel 120 for tile sizes 3×6 and 2×6. Using a 4-bit payload 510 as an example, first the 4-bit payload 510 is encoded to 16 bits by block code at block 512 then applied with repetition-2 at block 514. When using a 2×6 tile size, the 4-bits payload 510 may be encoded to 12 bits via a semi-orthogonal sequence and then applied with repetition-3 at block 514. Subsequently, the repeated coded bits may be binary phase shift keying (BPSK) modulated at block 516 and mapped to one UL FMT at block 518. As shown in FIG. 6, for each tile 410 of tile size 3×6 primary fast feedback channel 120, two tones are null tones 610, while for tile size 2×6, all tones are used for data transmission. The tile structure of 6×6 may be derived in similar manner as shown in FIG. 6, or alternatively using the structure of secondary fast feedback channel 122 as shown in and described with respect to FIG. 7, below, for a unified pilot pattern to reduce design complexity. Such an arrangement generally may not result in any performance difference. The channel symbol generation procedure when using tile size of 6×6 likewise will be similar the procedure 500 shown in FIG. 5 by just directly encoding the 4-bit payload 510 into 32 bits to achieve more spreading gain. In such an arrangement, 2-times repetition at block 514 may be skipped. For detection of primary fast feedback channel 120, non-coherent detection may be utilized as described, below.

In one or more embodiments, the transmitter sends one of the predefined sequences over adjacent frequency subcarriers and adjacent OFDM symbols. Each entry of the sequence modulates one subcarrier. If the channel correlation is known to the receiver, it is possible to apply an advanced receiver in this section. The channel correlation for different subcarriers can be estimated from channel delay spread. The channel correlation for different OFDM symbols can be estimated from Doppler. The advanced receiver is especially helpful to overcome the error floor when direct cross correlation is applied when the correlation of two sub carriers located in different frequency and time becomes low, for example when the speed is high.

The transmitter sends one of the predefined sequences over adjacent frequency subcarriers and adjacent OFDM symbols. Each entry of the sequence modulates one subcarrier. The receiver wants to detect which of the predefined sequences was sent without estimating the channel response. Denote predefined sequences as:

$$c_i = [c_i(1) \ldots c_i(N_f)]^T, \text{ for } i=1, \ldots, N_c, \qquad (1)$$

where $N_f$ is the length of the sequence and $N_c$ is the number of predefined sequences. The received signal is given by:

$$r(j) = c_{i_0}(j)h(j) + n(j), \text{ for } j=1, \ldots, N_f, \qquad (2)$$

where $i_0$ is the index of the transmitted sequence; j is the index of the subcarriers in the feedback channel; h(j) is the channel response of the j-th subcarrier; n(j) is the AWGN for j-th subcarrier. Furthermore, h(j) and n(j) are assumed to be zero mean and Gaussian distributed with variances 1 and $\sigma^2$, i.e. $h(j) \sim CN(0,1)$ and $n(j) \sim CN(0,\sigma^2)$. The channel responses are assumed unknown to the receiver but the correlations of the channel responses across subcarriers are assumed known. Namely, we have:

$$h = [h(1) \ldots h(N_f)]^T \sim CN(0,R), \qquad (3)$$

where $R = E(hh^H)$.

For sequence detection, let:

$$r_{c_i}(j) = r(j)c_i^{-1}(j), \text{ for } j=1, \ldots, N_f.$$

Then, $$r_{c_i}(j) = h(j)\frac{c_{i_0}(j)}{\frac{c_i(j)}{l_{c_i}(j)}} + \frac{n(j)c_i^{-1}(j)}{\eta(j)} \qquad (4)$$

$$= h(j)l_{c_i}(j) + \eta(j)$$

Since n(j) and $c_i(j)$ are independent and $\|c_i(j)\|=1$, $n(j)^{n(j)}$ and $\eta(j)$ has the same distribution. Moreover, $l_{c_i}(j)$ constant equals 1 if the candidate sequence $c_i$ is the transmitted sequence $c_{i_0}$. Otherwise, $l_{c_i}(j)$ is an independent and random phase rotation for $j=1, \ldots, N_f$ and therefore the first term in (5) is a independent, Gaussian random variable. Since each sequence is equally likely, the maximum posterior detection is the same as maximum likelihood detection. The maximum likelihood detection of the transmitted sequence $c_{i_0}$ is given by:

$$i_0 = \underset{i=1, \ldots, N_c}{\operatorname{argmax}} p(r \mid c_i) \qquad (5)$$

The conditional probability may be computed as:

$$p(r \mid c_i) = \int p(r \mid c_i, h)p(h)dh \qquad (6)$$

$$= \int p(r_{c_i} - h)p(h)dh$$

$$= c \int \exp\left(-\frac{1}{\sigma^2}(r_{c_i} - h)^H(r_{c_i} - h)\right)\exp(-h^H R^{-1}h)dh$$

$$= c \int \exp\left(-h^H \underbrace{(R^{-1} + \sigma^{-2}I)}_{R_r^{-1}} h + 2\operatorname{Re}\left(\frac{1}{\sigma^2}r_{c_i}^H h\right)\right)dh$$

$$= c \int \exp(-h^H R_r^{-1} h + 2\operatorname{Re}(r_{c_i}^H h))dh$$

$$= c\exp\left(\frac{1}{\sigma^4}r_{c_i}^H R_r r_{c_i}\right)$$

where c is the normalization factor that doesn't depend on $c_i$. Substitution of (6) into (5) gives:

$$i_0 = \underset{i=1, \ldots, N_c}{\operatorname{argmax}} p(r \mid c_i) \qquad (7)$$

$$= \underset{i=1,\ldots,N_c}{\operatorname{argmax}} r_{c_i}^H R_r r_{c_i}$$

where $R_r = (R^{-1} + \sigma^{-2}I)^{-1}$.

If the correlation R is not known at the receiver, R can be estimated from the previous uplink traffic such as association request and ACK. Otherwise, the maximum a posterior (MAP) detector can be obtained from (5) by adding one more term as:

$$i_0 = \underset{i=1,\ldots,N_c}{\operatorname{argmax}} p(r \mid c_i), \quad (8)$$

Where $$p(r \mid c_i) = \int_R p(r \mid c_i, R) p(R). \quad (9)$$

The base station may obtain samples of R for estimating the distribution of R, i.e. p(R) and evaluate (9) numerically. For low complexity, R may be parameterized by Doppler speed and only a few, e.g. 4 speeds are chosen for the evaluation of (9). For further complexity reduction, R of a speed, say a medium or a high speed e.g. 100 km/h or 300 km/h, is used in (14) without incurring (8) and (9). The reason is that R performs as a low pass filter on $r_{ci}$ and the Doppler speed roughly control the highest pass frequency. The exact R may be replaced by various low pass filters with small performance losses. For complexity reduction, some quantity can be pre-computed and stored. For example, $R_r$ can be computed for different speeds beforehand and stored in a look up table, although the scope of the claimed subject matter is not limited in this respect.

Figure 7:
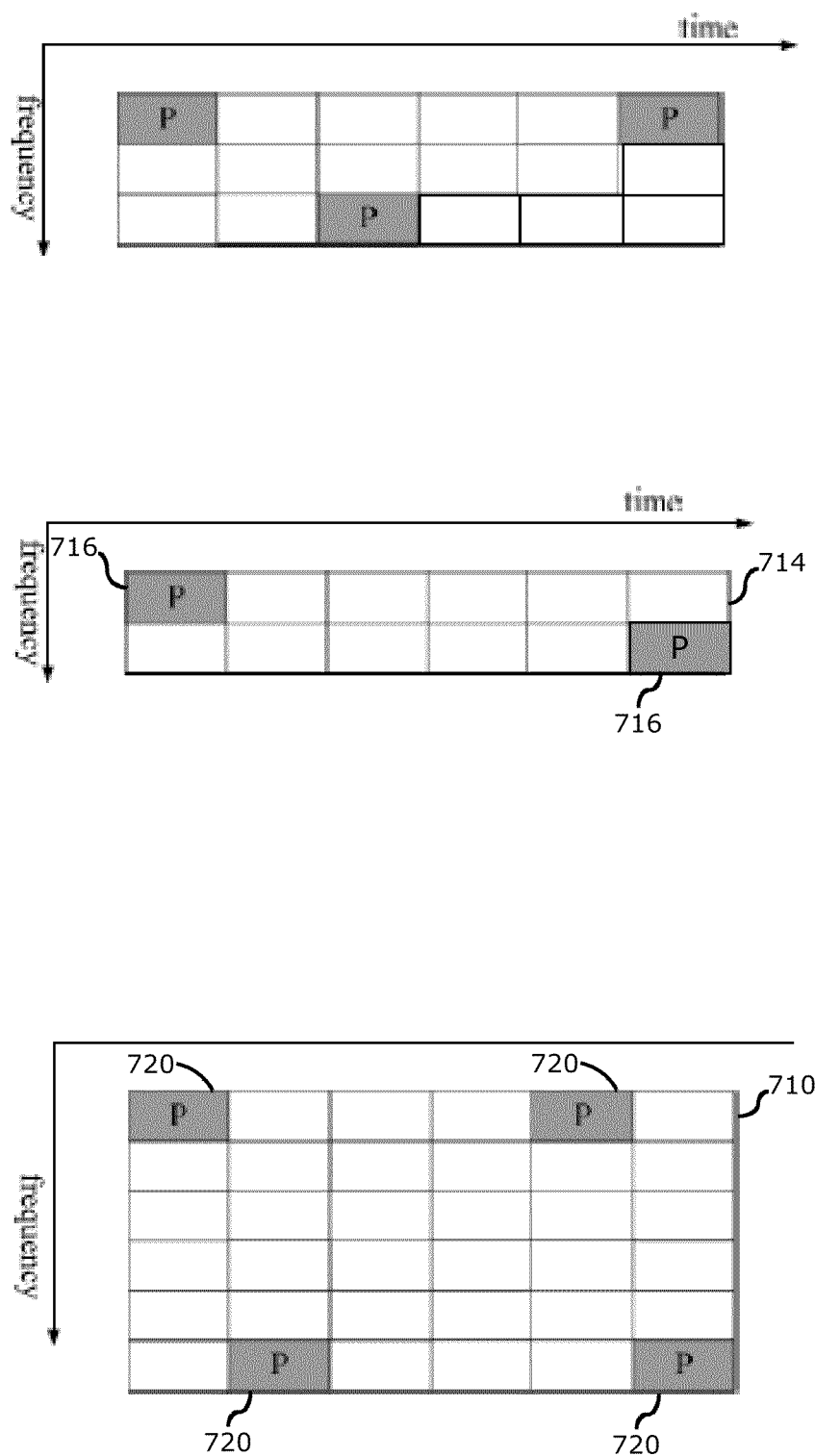
FIG. 7 is a diagram of control tile structures for a secondary fast feedback channel in accordance with one or more embodiments.
Figure 8:
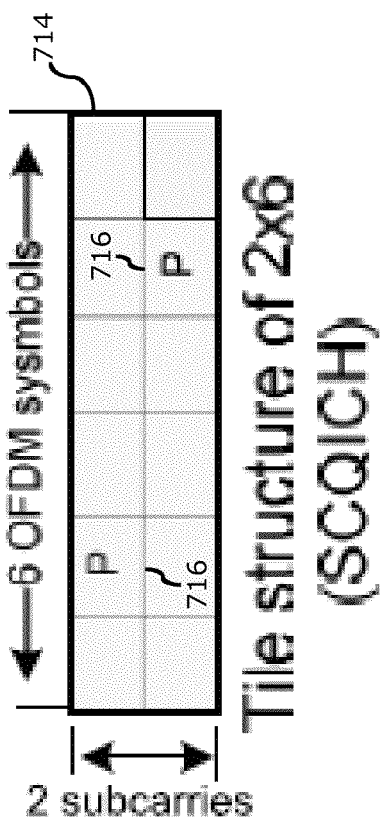
FIG. 8 is a diagram of the tile structure and mapping from coded block to a tile structure in accordance with one or more embodiments.
Figure 8:
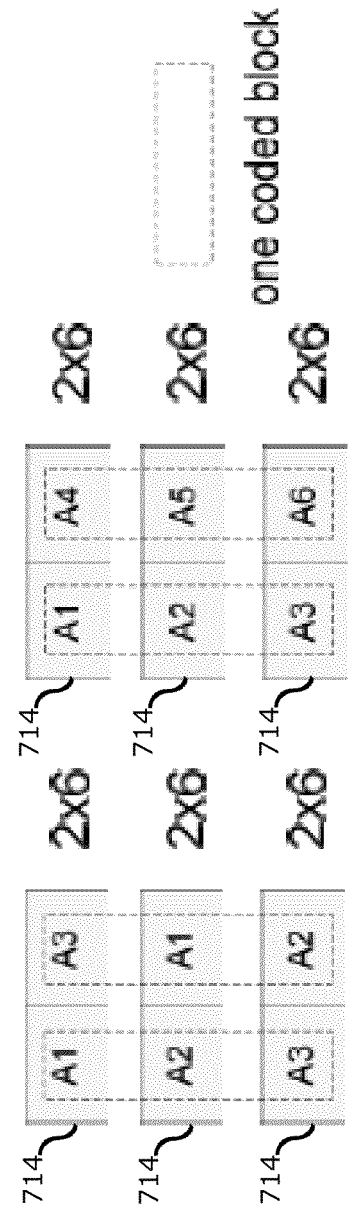
Figure 9:
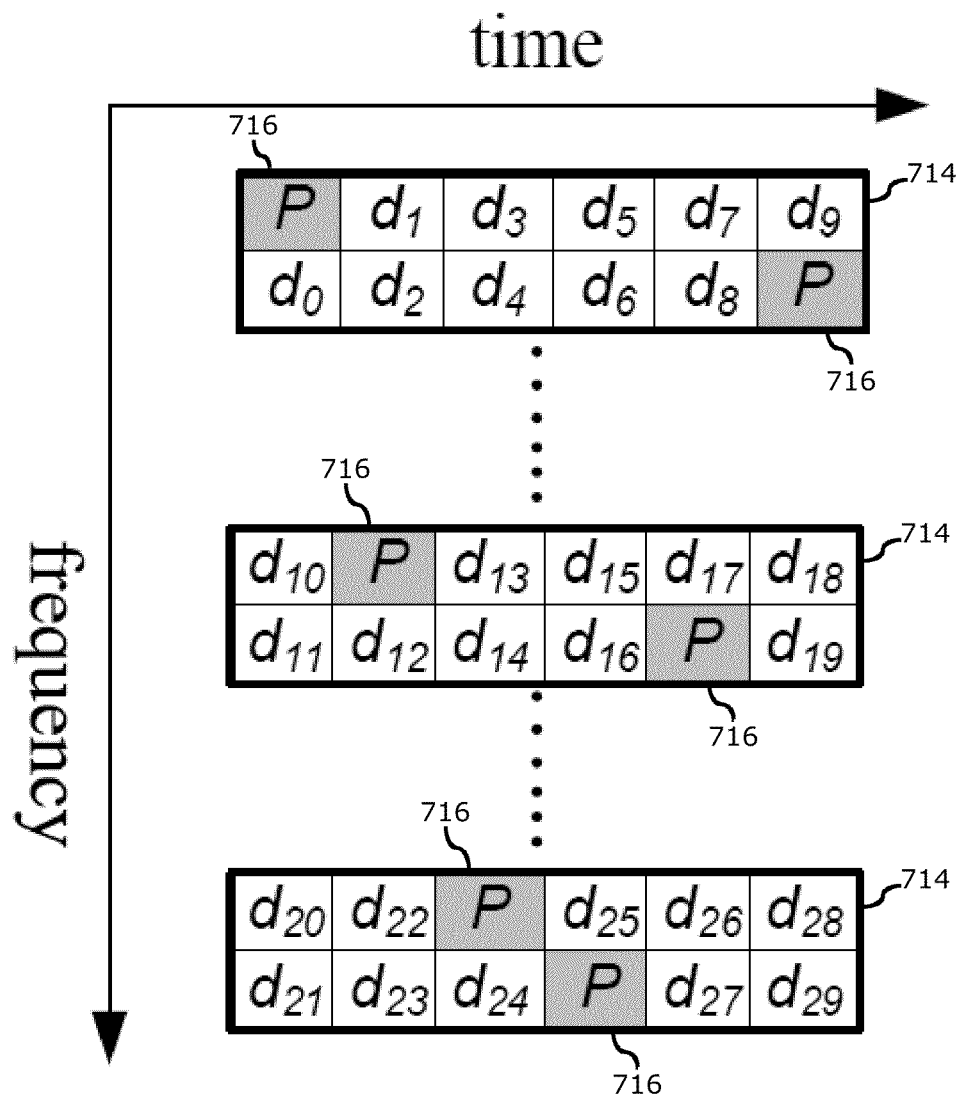
FIG. 9 is a diagram of an interlace pilot among 3 FMTs is a second fast feedback channel in accordance with one or more embodiments.

Referring now to FIG. 7 and FIG. 8, a diagram of control tile structures a and mapping from coded block to a tile structure for a secondary fast feedback channel in accordance with one or more embodiments will be discussed. Similarly as with primary fast feedback channel 120 discussed, secondary fast feedback channel 122 may be designed with block size of 6×6, while tile size can be either 3×6 or 2×6 in distributed/hopping localized mode or 6×6 in localized/distributed mode. As shown in FIG. 7, for a 3×6 tile size, one 6×6 block may be constructed from two UL FMTs 710 which may be chosen from different uplink distributed resource units (UL DRUs). An UL FMT 710 may comprise a time-frequency block of three contiguous subcarriers by six OFDM symbols having three fixed-location pilot tones 712. For a 2×6 tile size, one 6×6 block may be constructed from three UL FMTs 714 which may be chosen from different UL DRUs. In such an arrangement, an UL FMT 714 may comprise a time-frequency block of two contiguous subcarriers by six OFDM symbols having two fixed-location pilot tones 716. The pilot pattern can be either the one shown in FIG. 7 or the one in FIG. 8. Furthermore, to enhance coverage, an interlaced pilot arrangement 910 as shown in FIG. 9 may be utilized. For a 6×6 tile size, the UL FMT 718 may utilize four fixed-location pilot tones 720.

Figure 10:
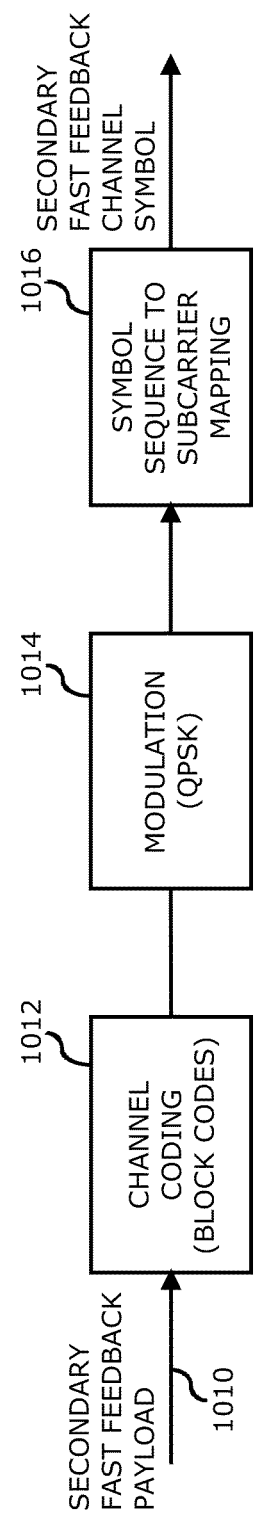
FIG. 10 is a diagram of the channel structure of an uplink secondary fast feedback channel in accordance with one or more embodiments.

Referring now to FIG. 9 and FIG. 10, a diagram of the channel structure and the interlace pilots among 3 FMTs in a second fast feedback channel in accordance with one or more embodiments will be discussed. The process of composing the structure of secondary fast feedback channel 122 is shown in FIG. 10. First, each block UL enhanced feedback payload 1010 comprises 1 to 11 information bits, which is encoded at block 1012 to either 30-bits in length when using tile size 3×6 or tile size 2×6 wherein the last two columns are punctured, or 32-bits length when using tile size 6×6 by the block code. The sequence may then be repeated by two times and quadrature phase shift keying (QPSK) modulated at block 1014. The modulated symbols may be mapped to a data subcarrier of the uplink enhanced fast feedback control channel.

As an example, the mapping from coded block to tile structure of 2×6 is shown in FIG. 8. Specifically, when using block codes, first, the secondary fast feedback channel 122 payload of l number of information bits $a_0 a_1 a_2 \ldots a_{l-1}$ are encoded to 60 bits $b_0 b_1 b_2 \ldots b_{59}$ using the linear block codes. When $6 < l \leq 12$, information bits $a_0 a_1 a_2 \ldots a_{l-1}$ may be encoded using the linear block code (60, 1). When $12 < l \leq 24$, information bits $a_0 a_1 a_2 \ldots a_{l-1}$ split into 2 parts: Part A comprising $a_0 a_1 a_2 \ldots a_{[l/2]-1}$, and Part B comprising $a_{[l/2]} a_{[l/2]+1} a_{[l/2]+2} \ldots a_{l-1}$. Part A may be encoded to 30-bits $b_0 b_1 b_2 \ldots b_{29}$ using a linear block code (30, [l/2]), and Part B may be encoded to 30-bits $b_{30} b_{31} b_{32} \ldots b_{59}$ using a linear block code (30, l−[l/2]). The coded sequence $b_0 b_1 b_2 \ldots b_{59}$ may then modulated to 30 symbols $c_0 c_1 c_2 \ldots c_{29}$ using QPSK modulation. In such an arrangement, $c_i (i=0, 1, \ldots 29)$ is formed by mapping coded bits $b_0 b_1 b_2 \ldots b_{29}$ onto the in-phase component and coded bits $b_{30} b_{31} b_{32} \ldots b_{59}$ onto the quadrature component. The modulated symbols $c_0 c_1 c_2 \ldots c_{29}$ and pilot sequence $p_0 p_1$ then may be mapped to the data subcarriers of the FMTs 714 of secondary fast feedback channel 122 as shown in FIG. 9.

Table 1, below, shows the semi-orthogonal sequence for primary fast feedback channel 120 when using tile size 2×6. The cross-correlation of these sequences are 6, 4, 2, 0. Such an arrangement is capable of supporting transmitting up to 6 information bits, and the former 16 sequences can be used when transmitting 4 bits, wherein the former 32 sequences may be utilized when transmitting 5 bits. Table 2 shows another set of the semi-orthogonal sequence for primary fast feedback channel 120 when using tile size 2×6. The cross-correlation of these sequences are 4, 0. Such an arrangement is capable of supporting transmitting up to 6 information bits, and the former 16 sequences can be used when transmitting 4 bits, and the former 32 sequences can be used when transmitting 5 bits.

TABLE 1

| 12-bit length semi-orthogonal sequences with max correlation distance = 6 ||
| --- | --- |
| # | Sequence |
| 1 | 1 1 1 1 1 1 1 1 1 1 1 1 |
| 2 | 1 0 1 0 1 1 1 0 0 0 1 0 |
| 3 | 1 0 0 1 0 1 1 1 0 0 0 1 |
| 4 | 1 1 0 0 1 0 1 1 1 0 0 0 |
| 5 | 1 0 1 0 0 1 0 1 1 1 0 0 |
| 6 | 1 0 0 1 0 0 1 0 1 1 1 0 |
| 7 | 1 0 0 0 1 0 0 1 0 1 1 1 |
| 8 | 1 1 0 0 0 1 0 0 1 0 1 1 |
| 9 | 1 1 1 0 0 0 1 0 0 1 0 1 |
| 10 | 1 1 1 1 0 0 0 1 0 0 1 0 |
| 11 | 1 0 1 1 1 0 0 0 1 0 0 1 |
| 12 | 1 1 0 1 1 1 0 0 0 1 0 0 |
| 13 | 0 0 0 0 0 0 0 0 1 1 1 1 |
| 14 | 0 0 0 0 0 0 1 1 0 1 0 1 |
| 15 | 0 0 0 0 0 1 0 1 0 1 1 0 |
| 16 | 0 0 0 0 1 1 1 0 1 0 1 0 |
| 17 | 0 0 0 0 1 0 0 1 1 0 0 1 |
| 18 | 0 0 0 0 1 0 1 0 0 1 1 0 |
| 19 | 0 0 0 0 1 1 0 1 0 1 0 0 |

TABLE 1-continued 12-bit length semi-orthogonal sequences with max correlation distance = 6

| # | Sequence |
|---|---|
| 20 | 0 0 0 1 0 0 0 1 0 1 1 0 |
| 21 | 0 0 0 1 0 0 1 0 1 0 0 1 |
| 22 | 0 0 0 1 0 1 0 0 1 1 0 0 |
| 23 | 0 0 0 1 0 1 1 1 1 1 1 1 |
| 24 | 0 0 0 1 1 0 0 0 0 1 0 1 |
| 25 | 0 0 0 1 1 1 1 0 0 0 0 0 |
| 26 | 0 0 1 0 0 0 1 0 1 1 0 0 |
| 27 | 0 0 1 0 0 1 0 0 1 0 0 1 |
| 28 | 0 0 1 0 0 1 1 1 0 0 0 0 |
| 29 | 0 0 1 0 1 0 0 0 0 0 1 1 |
| 30 | 0 0 1 0 1 1 0 1 1 1 1 1 |
| 31 | 0 0 1 1 0 0 0 0 1 0 1 0 |
| 32 | 0 0 1 1 0 0 0 1 0 0 0 1 |
| 33 | 0 0 1 1 1 0 1 0 1 1 1 1 |
| 34 | 0 0 1 1 1 1 1 1 0 0 1 1 |
| 35 | 0 1 0 0 0 0 0 1 1 0 1 0 |
| 36 | 0 1 0 0 0 1 0 0 0 1 0 1 |
| 37 | 0 1 0 0 0 1 1 1 1 0 0 1 |
| 38 | 0 1 0 0 1 0 1 1 1 1 1 1 |
| 39 | 0 1 0 0 1 1 0 0 0 0 1 0 |
| 40 | 0 1 0 1 1 0 0 0 1 0 0 0 |
| 41 | 0 1 1 0 0 0 0 1 0 1 0 0 |
| 42 | 0 1 1 0 0 0 1 0 0 0 1 0 |
| 43 | 0 1 1 0 0 1 1 0 1 1 1 1 |
| 44 | 0 1 1 0 1 1 1 0 0 1 0 0 |
| 45 | 0 1 1 1 0 0 1 1 0 1 1 1 |
| 46 | 0 1 1 1 0 1 0 1 1 1 1 0 |
| 47 | 0 1 1 1 1 0 0 1 1 0 1 1 |
| 48 | 0 1 1 1 1 1 0 0 1 1 0 1 |
| 49 | 0 0 0 0 0 0 0 1 1 1 0 0 |
| 50 | 0 0 0 0 0 0 1 0 0 0 1 1 |
| 51 | 0 0 0 0 0 1 0 0 0 1 1 0 |
| 52 | 0 0 0 0 1 0 0 0 1 0 1 0 |
| 53 | 0 0 0 0 1 0 1 1 0 0 0 0 |
| 54 | 0 0 0 0 1 1 0 0 0 0 0 1 |
| 55 | 0 0 0 0 1 1 1 1 0 1 1 1 |
| 56 | 0 0 0 1 0 0 1 0 0 1 0 0 |
| 57 | 0 0 0 1 0 0 1 1 1 0 1 0 |
| 58 | 0 0 0 1 0 1 0 0 1 0 1 1 |
| 59 | 0 0 0 1 0 1 0 1 0 0 0 0 |
| 60 | 0 0 0 1 1 0 0 1 0 0 1 1 |
| 61 | 0 0 0 1 1 0 1 1 1 1 0 1 |
| 62 | 0 0 0 1 1 1 1 0 1 1 1 0 |
| 63 | 0 0 1 0 0 0 0 0 0 1 0 1 |
| 64 | 0 0 1 0 0 0 0 1 0 0 1 0 |

TABLE 2

12-bit length semi-orthogonal sequence with max correlation distance = 4

| n | $v_{0,n}$ | $v_{1,n}$ | $v_{2,n}$ | $v_{3,n}$ | $v_{4,n}$ | $v_{5,n}$ | $v_{6,n}$ | $v_{7,n}$ | $v_{8,n}$ | $v_{9,n}$ | $v_{10,n}$ | $v_{11,n}$ |
|---|---|---|---|---|---|---|---|---|---|---|---|---|
| 0 | 1 | −1 | 1 | 1 | −1 | 1 | −1 | −1 | 1 | 1 | −1 | −1 |
| 1 | 1 | −1 | −1 | −1 | 1 | 1 | −1 | −1 | 1 | −1 | 1 | 1 |
| 2 | 1 | −1 | 1 | 1 | 1 | 1 | 1 | 1 | 1 | 1 | 1 | 1 |
| 3 | 1 | 1 | 1 | 1 | 1 | −1 | 1 | −1 | 1 | −1 | 1 | −1 |
| 4 | 1 | −1 | 1 | −1 | 1 | 1 | 1 | 1 | −1 | 1 | −1 | 1 |
| 5 | 1 | −1 | 1 | −1 | 1 | −1 | 1 | −1 | −1 | −1 | −1 | −1 |
| 6 | 1 | −1 | 1 | 1 | −1 | −1 | 1 | 1 | −1 | −1 | 1 | 1 |
| 7 | 1 | 1 | 1 | −1 | −1 | 1 | −1 | −1 | −1 | 1 | 1 | −1 |
| 8 | 1 | 1 | 1 | −1 | −1 | −1 | −1 | 1 | −1 | −1 | 1 | 1 |
| 9 | 1 | −1 | −1 | −1 | 1 | −1 | 1 | 1 | 1 | 1 | 1 | −1 |
| 10 | 1 | 1 | 1 | 1 | 1 | 1 | −1 | −1 | −1 | −1 | 1 | 1 |
| 11 | 1 | 1 | −1 | 1 | 1 | −1 | −1 | 1 | −1 | 1 | −1 | 1 |
| 12 | 1 | 1 | −1 | −1 | −1 | 1 | 1 | 1 | 1 | −1 | −1 | −1 |
| 13 | 1 | 1 | −1 | −1 | −1 | 1 | −1 | 1 | 1 | 1 | −1 | 1 |
| 14 | 1 | 1 | −1 | −1 | 1 | 1 | 1 | 1 | −1 | −1 | 1 | −1 |
| 15 | 1 | −1 | −1 | 1 | −1 | −1 | 1 | −1 | −1 | 1 | 1 | 1 |
| 16 | 1 | 1 | 1 | −1 | −1 | 1 | −1 | −1 | 1 | −1 | −1 | 1 |
| 17 | 1 | 1 | 1 | −1 | −1 | −1 | −1 | 1 | 1 | −1 | 1 | −1 |
| 18 | 1 | −1 | 1 | 1 | −1 | 1 | −1 | −1 | −1 | −1 | 1 | 1 |
| 19 | 1 | −1 | 1 | 1 | −1 | −1 | −1 | 1 | 1 | 1 | 1 | −1 |
| 20 | 1 | −1 | 1 | −1 | 1 | 1 | 1 | 1 | 1 | −1 | 1 | −1 |
| 21 | 1 | −1 | 1 | −1 | 1 | 1 | −1 | 1 | 1 | 1 | 1 | 1 |
| 22 | 1 | 1 | 1 | 1 | 1 | 1 | 1 | 1 | −1 | −1 | −1 | −1 |
| 23 | 1 | 1 | 1 | 1 | 1 | −1 | 1 | −1 | −1 | 1 | −1 | 1 |
| 24 | 1 | 1 | −1 | 1 | 1 | 1 | −1 | −1 | 1 | 1 | 1 | −1 |
| 25 | 1 | 1 | −1 | 1 | 1 | −1 | −1 | 1 | −1 | 1 | 1 | 1 |
| 26 | 1 | −1 | −1 | 1 | −1 | 1 | 1 | 1 | 1 | 1 | −1 | 1 |
| 27 | 1 | 1 | −1 | −1 | −1 | 1 | 1 | 1 | 1 | −1 | 1 | 1 |
| 28 | 1 | −1 | −1 | −1 | 1 | 1 | −1 | −1 | 1 | −1 | 1 | −1 |
| 29 | 1 | −1 | −1 | −1 | 1 | −1 | 1 | −1 | −1 | −1 | −1 | 1 |
| 30 | 1 | −1 | −1 | 1 | −1 | −1 | 1 | −1 | 1 | −1 | −1 | −1 |
| 31 | 1 | 1 | −1 | −1 | −1 | −1 | 1 | −1 | −1 | −1 | 1 | −1 |
| 32 | 1 | −1 | −1 | 1 | 1 | 1 | −1 | 1 | −1 | −1 | −1 | −1 |
| 33 | 1 | −1 | −1 | 1 | 1 | −1 | −1 | 1 | 1 | −1 | 1 | 1 |
| 34 | 1 | 1 | −1 | −1 | 1 | 1 | −1 | 1 | −1 | −1 | 1 | −1 |
| 35 | 1 | 1 | −1 | −1 | 1 | −1 | −1 | −1 | −1 | 1 | 1 | 1 |
| 36 | 1 | −1 | −1 | −1 | −1 | 1 | 1 | −1 | 1 | 1 | 1 | 1 |
| 37 | 1 | −1 | −1 | −1 | −1 | −1 | 1 | −1 | 1 | −1 | −1 | −1 |
| 38 | 1 | 1 | −1 | 1 | −1 | 1 | 1 | −1 | 1 | −1 | −1 | −1 |
| 39 | 1 | 1 | −1 | 1 | −1 | −1 | 1 | −1 | −1 | −1 | −1 | 1 |
| 40 | 1 | 1 | 1 | −1 | 1 | 1 | −1 | 1 | 1 | 1 | −1 | 1 |
| 41 | 1 | 1 | 1 | −1 | 1 | −1 | 1 | 1 | 1 | −1 | −1 | 1 |
| 42 | 1 | −1 | 1 | 1 | 1 | 1 | 1 | −1 | 1 | −1 | 1 | 1 |

TABLE 2-continued 12-bit length semi-orthogonal sequence with max correlation distance = 4

| n | $v_{0,n}$ | $v_{1,n}$ | $v_{2,n}$ | $v_{3,n}$ | $v_{4,n}$ | $v_{5,n}$ | $v_{6,n}$ | $v_{7,n}$ | $v_{8,n}$ | $v_{9,n}$ | $v_{10,n}$ | $v_{11,n}$ |
|---|---|---|---|---|---|---|---|---|---|---|---|---|
| 43 | 1 | −1 | 1 | 1 | 1 | −1 | 1 | 1 | 1 | 1 | −1 | −1 |
| 44 | 1 | 1 | 1 | −1 | 1 | 1 | 1 | −1 | −1 | −1 | 1 | 1 |
| 45 | 1 | 1 | 1 | −1 | 1 | −1 | 1 | 1 | −1 | 1 | 1 | −1 |
| 46 | 1 | −1 | 1 | 1 | 1 | 1 | 1 | −1 | 1 | 1 | 1 | −1 |
| 47 | 1 | −1 | 1 | 1 | 1 | −1 | 1 | 1 | −1 | −1 | 1 | 1 |
| 48 | 1 | 1 | 1 | 1 | −1 | 1 | −1 | 1 | 1 | −1 | 1 | −1 |
| 49 | 1 | 1 | 1 | 1 | −1 | −1 | −1 | −1 | 1 | 1 | 1 | 1 |
| 50 | 1 | −1 | 1 | −1 | −1 | 1 | −1 | 1 | 1 | 1 | 1 | 1 |
| 51 | 1 | 1 | 1 | 1 | −1 | 1 | −1 | −1 | 1 | 1 | −1 | 1 |
| 52 | 1 | 1 | −1 | −1 | 1 | 1 | 1 | 1 | 1 | 1 | −1 | 1 |
| 53 | 1 | −1 | −1 | 1 | 1 | 1 | −1 | 1 | −1 | 1 | 1 | 1 |
| 54 | 1 | 1 | −1 | 1 | −1 | 1 | 1 | −1 | 1 | −1 | 1 | 1 |
| 55 | 1 | 1 | 1 | −1 | 1 | −1 | 1 | 1 | 1 | 1 | 1 | −1 |
| 56 | 1 | −1 | 1 | −1 | −1 | −1 | −1 | −1 | 1 | −1 | 1 | −1 |
| 57 | 1 | 1 | 1 | 1 | −1 | −1 | −1 | −1 | −1 | −1 | −1 | −1 |
| 58 | 1 | −1 | 1 | −1 | −1 | 1 | −1 | 1 | −1 | −1 | −1 | −1 |
| 59 | 1 | −1 | 1 | −1 | 1 | −1 | −1 | −1 | 1 | 1 | −1 | 1 |
| 60 | 1 | 1 | −1 | −1 | 1 | −1 | −1 | −1 | 1 | −1 | −1 | −1 |
| 61 | 1 | −1 | −1 | 1 | 1 | −1 | −1 | −1 | −1 | −1 | 1 | −1 |
| 62 | 1 | −1 | −1 | −1 | −1 | 1 | 1 | −1 | −1 | −1 | −1 | 1 |
| 63 | 1 | −1 | −1 | −1 | −1 | −1 | 1 | 1 | −1 | 1 | −1 | −1 |

Block codes utilized herein may be based at least in part on unified channel coding for primary fast feedback channel 120 and/or secondary fast feedback channel 122. The information bits of CQI are encoded by two separate block codes. The number of information bits may be from 1 to 11 bits, denoted by $a_0 a_1 a_2 \ldots a_{K-1}$ where $K=1 \ldots 11$. In one or more embodiments, there are two block codes defined in Table 3 and Table 4, below, for a different number of information bits. The codeword may be obtained by a linear combination of the 6 or 12 basis sequences denoted as $S_{i,n}$ in Table 3 and Table 4, below.

TABLE 3

Basis sequences for (32, K < 7) codes

| N | S0,n | S1,n | S2,n | S3,n | S4,n | S5,n |
|---|---|---|---|---|---|---|
| 0 | 1 | 0 | 1 | 1 | 0 | 1 |
| 1 | 0 | 1 | 0 | 0 | 0 | 1 |
| 2 | 1 | 1 | 0 | 1 | 0 | 1 |
| 3 | 0 | 0 | 0 | 1 | 0 | 0 |
| 4 | 0 | 0 | 1 | 0 | 0 | 1 |
| 5 | 0 | 1 | 1 | 1 | 0 | 0 |
| 6 | 1 | 1 | 1 | 0 | 0 | 0 |
| 7 | 1 | 0 | 0 | 0 | 0 | 0 |
| 8 | 0 | 0 | 0 | 0 | 1 | 1 |
| 9 | 1 | 1 | 0 | 0 | 1 | 0 |
| 10 | 0 | 1 | 0 | 1 | 1 | 0 |
| 11 | 0 | 1 | 1 | 0 | 1 | 1 |
| 12 | 1 | 0 | 1 | 0 | 1 | 0 |
| 13 | 1 | 0 | 0 | 1 | 1 | 1 |
| 14 | 0 | 0 | 1 | 1 | 1 | 0 |
| 15 | 1 | 1 | 1 | 1 | 1 | 1 |
| 16 | 0 | 0 | 0 | 0 | 0 | 1 |
| 17 | 0 | 0 | 0 | 1 | 1 | 0 |
| 18 | 0 | 0 | 1 | 1 | 0 | 0 |
| 19 | 0 | 1 | 1 | 0 | 0 | 1 |
| 20 | 1 | 0 | 0 | 1 | 0 | 1 |
| 21 | 0 | 0 | 1 | 0 | 1 | 1 |
| 22 | 1 | 1 | 0 | 1 | 1 | 1 |
| 23 | 1 | 0 | 1 | 1 | 1 | 1 |
| 24 | 0 | 1 | 1 | 1 | 1 | 0 |
| 25 | 1 | 1 | 1 | 1 | 0 | 1 |
| 26 | 1 | 1 | 1 | 0 | 1 | 0 |
| 27 | 0 | 1 | 0 | 1 | 0 | 0 |
| 28 | 1 | 0 | 1 | 0 | 0 | 0 |
| 29 | 1 | 0 | 0 | 0 | 1 | 0 |
| 30 | 0 | 1 | 0 | 0 | 1 | 1 |
| 31 | 1 | 1 | 0 | 0 | 0 | 0 |

TABLE 4

Basis sequences for (30, 7 ≤ K ≤ 12) code

| n | S0,n | S1,n | S2,n | S3,n | S4,n | S5,n | S6,n | S7,n | S8,n | S9,n | S10,n | S11,n |
|---|---|---|---|---|---|---|---|---|---|---|---|---|
| 0 | 1 | 0 | 0 | 0 | 0 | 0 | 0 | 0 | 0 | 0 | 0 | 1 |
| 1 | 0 | 1 | 0 | 0 | 0 | 0 | 0 | 0 | 0 | 0 | 0 | 0 |
| 2 | 1 | 0 | 0 | 0 | 0 | 0 | 0 | 1 | 0 | 0 | 0 | 1 |
| 3 | 1 | 1 | 0 | 0 | 1 | 0 | 0 | 0 | 0 | 0 | 0 | 0 |
| 4 | 0 | 1 | 0 | 0 | 0 | 1 | 1 | 0 | 0 | 0 | 0 | 1 |
| 5 | 0 | 0 | 0 | 0 | 1 | 1 | 0 | 1 | 0 | 0 | 0 | 0 |
| 6 | 0 | 0 | 0 | 0 | 1 | 0 | 1 | 0 | 1 | 0 | 0 | 1 |
| 7 | 1 | 0 | 0 | 0 | 0 | 1 | 1 | 0 | 0 | 1 | 0 | 0 |
| 8 | 0 | 1 | 0 | 1 | 0 | 1 | 0 | 0 | 1 | 0 | 0 | 0 |
| 9 | 0 | 0 | 1 | 0 | 0 | 0 | 0 | 1 | 1 | 1 | 0 | 1 |
| 10 | 1 | 0 | 0 | 1 | 1 | 0 | 0 | 0 | 0 | 1 | 1 | 0 |
| 11 | 1 | 1 | 1 | 1 | 0 | 0 | 1 | 0 | 0 | 0 | 0 | 0 |
| 12 | 0 | 1 | 0 | 1 | 0 | 0 | 1 | 0 | 1 | 0 | 1 | 0 |

TABLE 4-continued

Basis sequences for (30, 7 ≤ K ≤ 12) code

| n | S0,n | S1,n | S2,n | S3,n | S4,n | S5,n | S6,n | S7,n | S8,n | S9,n | S10,n | S11,n |
|---|---|---|---|---|---|---|---|---|---|---|---|---|
| 13 | 1 | 0 | 0 | 0 | 1 | 0 | 0 | 1 | 1 | 0 | 1 | 1 |
| 14 | 1 | 1 | 0 | 0 | 1 | 0 | 1 | 0 | 0 | 1 | 0 | 0 |
| 15 | 0 | 1 | 0 | 1 | 0 | 1 | 1 | 1 | 0 | 0 | 0 | 0 |
| 16 | 1 | 0 | 1 | 0 | 1 | 1 | 1 | 1 | 0 | 0 | 0 | 0 |
| 17 | 0 | 1 | 0 | 0 | 1 | 0 | 1 | 0 | 1 | 1 | 1 | 1 |
| 18 | 1 | 0 | 0 | 1 | 0 | 1 | 1 | 1 | 0 | 1 | 0 | 0 |
| 19 | 0 | 1 | 1 | 1 | 1 | 1 | 0 | 0 | 1 | 0 | 0 | 0 |
| 20 | 1 | 0 | 1 | 0 | 0 | 0 | 1 | 1 | 1 | 1 | 1 | 0 |
| 21 | 0 | 1 | 0 | 1 | 1 | 1 | 0 | 0 | 0 | 1 | 1 | 1 |
| 22 | 0 | 0 | 1 | 1 | 0 | 0 | 1 | 1 | 1 | 0 | 0 | 0 |
| 23 | 0 | 0 | 1 | 0 | 1 | 1 | 0 | 0 | 0 | 1 | 1 | 0 |
| 24 | 0 | 0 | 0 | 1 | 0 | 0 | 1 | 0 | 1 | 0 | 1 | 0 |
| 25 | 0 | 0 | 1 | 0 | 0 | 1 | 0 | 0 | 0 | 1 | 0 | 1 |
| 26 | 0 | 0 | 0 | 1 | 0 | 0 | 0 | 0 | 1 | 0 | 1 | 0 |
| 27 | 0 | 0 | 1 | 0 | 0 | 0 | 0 | 0 | 0 | 1 | 0 | 0 |
| 28 | 0 | 0 | 0 | 1 | 0 | 0 | 0 | 0 | 0 | 0 | 1 | 1 |
| 29 | 0 | 0 | 1 | 0 | 0 | 0 | 0 | 0 | 0 | 0 | 0 | 1 |

Block codes utilized herein may be of length 60 for secondary fast feedback channel 122. The information bits in secondary fast feedback channel 122 may be encoded using linear block codes. In one or more embodiments, the codeword length, N, may not be larger than 60. The number of information bits, K, may vary from 6 to 12 bits, denoted by $a_0 a_1 a_2 \ldots a_{K-1}$ where $6 \leq K \leq 12$. The codeword can be obtained as a linear combination of the K basis sequences denoted as $S_{i,n}$ where $i=0 \ldots K-1$ in Table 5, below.

TABLE 5

Basis sequences for block codes (N, K) code

| N | $S_{0,n}$ | $S_{1,n}$ | $S_{2,n}$ | $S_{3,n}$ | $S_{4,n}$ | $S_{5,n}$ | $S_{6,n}$ | $S_{7,n}$ | $S_{8,n}$ | $S_{9,n}$ | $S_{10,n}$ | $S_{11,n}$ |
|---|---|---|---|---|---|---|---|---|---|---|---|---|
| 0 | 1 | 1 | 1 | 0 | 0 | 0 | 1 | 0 | 1 | 0 | 1 | 0 |
| 1 | 0 | 0 | 0 | 1 | 0 | 0 | 1 | 0 | 1 | 1 | 1 | 1 |
| 2 | 1 | 0 | 1 | 0 | 1 | 0 | 0 | 1 | 0 | 0 | 1 | 1 |
| 3 | 0 | 1 | 1 | 1 | 0 | 1 | 0 | 1 | 0 | 0 | 0 | 0 |
| 4 | 1 | 1 | 1 | 1 | 1 | 0 | 0 | 0 | 1 | 1 | 1 | 0 |
| 5 | 0 | 0 | 0 | 1 | 1 | 1 | 1 | 0 | 1 | 1 | 0 | 0 |
| 6 | 1 | 0 | 0 | 0 | 1 | 1 | 1 | 0 | 0 | 0 | 1 | 1 |
| 7 | 1 | 0 | 0 | 0 | 0 | 1 | 0 | 1 | 1 | 0 | 1 | 1 |
| 8 | 0 | 0 | 0 | 0 | 0 | 0 | 0 | 1 | 1 | 0 | 1 | 0 |
| 9 | 1 | 0 | 1 | 0 | 0 | 0 | 0 | 0 | 0 | 0 | 0 | 0 |
| 10 | 0 | 1 | 0 | 1 | 0 | 0 | 0 | 0 | 0 | 0 | 0 | 0 |
| 11 | 1 | 1 | 1 | 0 | 1 | 0 | 1 | 0 | 1 | 1 | 1 | 0 |
| 12 | 1 | 1 | 1 | 1 | 0 | 1 | 0 | 0 | 0 | 1 | 1 | 1 |
| 13 | 0 | 1 | 1 | 1 | 1 | 0 | 1 | 1 | 0 | 1 | 1 | 0 |
| 14 | 1 | 1 | 0 | 1 | 1 | 1 | 0 | 1 | 1 | 0 | 0 | 1 |
| 15 | 0 | 0 | 1 | 0 | 1 | 1 | 0 | 1 | 1 | 1 | 0 | 1 |
| 16 | 1 | 0 | 0 | 1 | 0 | 1 | 1 | 1 | 0 | 0 | 1 | 0 |
| 17 | 0 | 1 | 1 | 0 | 1 | 0 | 1 | 0 | 0 | 0 | 0 | 1 |
| 18 | 0 | 0 | 0 | 1 | 0 | 1 | 0 | 1 | 0 | 1 | 0 | 1 |
| 19 | 0 | 0 | 0 | 0 | 1 | 0 | 1 | 1 | 0 | 0 | 1 | 0 |
| 20 | 1 | 1 | 0 | 0 | 0 | 1 | 1 | 0 | 1 | 0 | 1 | 1 |
| 21 | 1 | 1 | 1 | 0 | 0 | 0 | 1 | 1 | 0 | 1 | 0 | 1 |
| 22 | 1 | 0 | 1 | 1 | 0 | 0 | 1 | 1 | 1 | 1 | 0 | 1 |
| 23 | 0 | 0 | 1 | 1 | 1 | 0 | 1 | 1 | 1 | 0 | 0 | 1 |
| 24 | 0 | 1 | 1 | 1 | 1 | 1 | 1 | 1 | 1 | 0 | 1 | 1 |
| 25 | 0 | 1 | 0 | 1 | 1 | 1 | 0 | 1 | 1 | 1 | 1 | 1 |
| 26 | 1 | 0 | 1 | 0 | 1 | 1 | 1 | 1 | 0 | 1 | 1 | 0 |
| 27 | 1 | 0 | 0 | 1 | 0 | 1 | 0 | 0 | 1 | 0 | 0 | 1 |
| 28 | 0 | 0 | 1 | 0 | 1 | 0 | 0 | 1 | 1 | 0 | 1 | 0 |
| 29 | 0 | 1 | 0 | 1 | 0 | 1 | 1 | 0 | 1 | 0 | 1 | 0 |
| 30 | 1 | 0 | 1 | 0 | 1 | 0 | 1 | 0 | 0 | 1 | 0 | 1 |
| 31 | 1 | 0 | 1 | 0 | 0 | 1 | 1 | 1 | 1 | 0 | 0 | 1 |
| 32 | 1 | 1 | 0 | 1 | 1 | 0 | 1 | 1 | 0 | 0 | 0 | 1 |
| 33 | 0 | 1 | 0 | 0 | 1 | 1 | 0 | 1 | 0 | 1 | 0 | 1 |
| 34 | 1 | 1 | 1 | 0 | 0 | 1 | 0 | 1 | 1 | 0 | 0 | 0 |
| 35 | 0 | 0 | 1 | 1 | 0 | 0 | 0 | 1 | 1 | 0 | 0 | 0 |
| 36 | 0 | 1 | 1 | 1 | 1 | 0 | 1 | 0 | 1 | 0 | 0 | 0 |
| 37 | 1 | 0 | 0 | 1 | 1 | 1 | 0 | 0 | 0 | 1 | 0 | 1 |

TABLE 5-continued

Basis sequences for block codes (N, K) code

| N | $S_{0,n}$ | $S_{1,n}$ | $S_{2,n}$ | $S_{3,n}$ | $S_{4,n}$ | $S_{5,n}$ | $S_{6,n}$ | $S_{7,n}$ | $S_{8,n}$ | $S_{9,n}$ | $S_{10,n}$ | $S_{11,n}$ |
|---|---|---|---|---|---|---|---|---|---|---|---|---|
| 38 | 1 | 0 | 1 | 0 | 1 | 1 | 0 | 1 | 1 | 0 | 0 | 0 |
| 39 | 0 | 0 | 1 | 1 | 0 | 1 | 0 | 0 | 1 | 0 | 1 | 0 |
| 40 | 1 | 0 | 1 | 1 | 1 | 0 | 1 | 0 | 0 | 0 | 0 | 0 |
| 41 | 0 | 1 | 0 | 1 | 1 | 1 | 0 | 0 | 0 | 0 | 0 | 1 |
| 42 | 1 | 1 | 1 | 0 | 1 | 1 | 0 | 1 | 1 | 1 | 1 | 0 |
| 43 | 1 | 1 | 1 | 1 | 0 | 1 | 1 | 0 | 0 | 1 | 1 | 0 |
| 44 | 1 | 0 | 0 | 1 | 1 | 0 | 0 | 0 | 1 | 1 | 0 | 1 |
| 45 | 1 | 1 | 0 | 0 | 1 | 1 | 0 | 1 | 0 | 0 | 1 | 0 |
| 46 | 1 | 0 | 0 | 0 | 0 | 1 | 0 | 0 | 1 | 1 | 1 | 0 |
| 47 | 0 | 0 | 0 | 0 | 0 | 0 | 0 | 0 | 1 | 0 | 0 | 0 |
| 48 | 1 | 0 | 0 | 0 | 0 | 0 | 0 | 0 | 0 | 0 | 0 | 0 |
| 49 | 0 | 1 | 0 | 0 | 0 | 0 | 0 | 0 | 0 | 0 | 0 | 0 |
| 50 | 0 | 0 | 0 | 0 | 0 | 0 | 0 | 0 | 1 | 0 | 0 | 0 |
| 51 | 0 | 0 | 0 | 0 | 0 | 0 | 0 | 0 | 0 | 0 | 1 | 0 |
| 52 | 0 | 0 | 1 | 0 | 0 | 0 | 0 | 0 | 0 | 0 | 0 | 0 |
| 53 | 0 | 0 | 0 | 1 | 0 | 0 | 0 | 0 | 0 | 0 | 0 | 0 |
| 54 | 0 | 0 | 0 | 0 | 1 | 0 | 0 | 0 | 0 | 0 | 0 | 0 |
| 55 | 0 | 0 | 0 | 0 | 0 | 1 | 0 | 0 | 0 | 0 | 0 | 0 |
| 56 | 0 | 0 | 0 | 0 | 0 | 0 | 1 | 0 | 0 | 0 | 0 | 0 |
| 57 | 0 | 0 | 0 | 0 | 0 | 0 | 0 | 0 | 0 | 0 | 0 | 1 |
| 58 | 0 | 0 | 0 | 0 | 0 | 0 | 0 | 1 | 0 | 0 | 0 | 0 |
| N − 1 | | | | | | parity check bit | | | | | | |

In one or more embodiments, if $b_0 b_1 b_2 \ldots b_{N-1}$ denotes a codeword with length of N, any component of the codeword can be generated as:

$$b_n = \sum_{i=0}^{K-1} (a_i \cdot S_{i,n}) \bmod 2.$$

where n=0, 1, 2, . . . , N−2. After the N−1 components are generated, a parity check bit is appended to the codeword. The parity check bit is set to 1 when the number '1' in the codeword appears an odd number of times, otherwise it is set to '0'.

Figure 11:
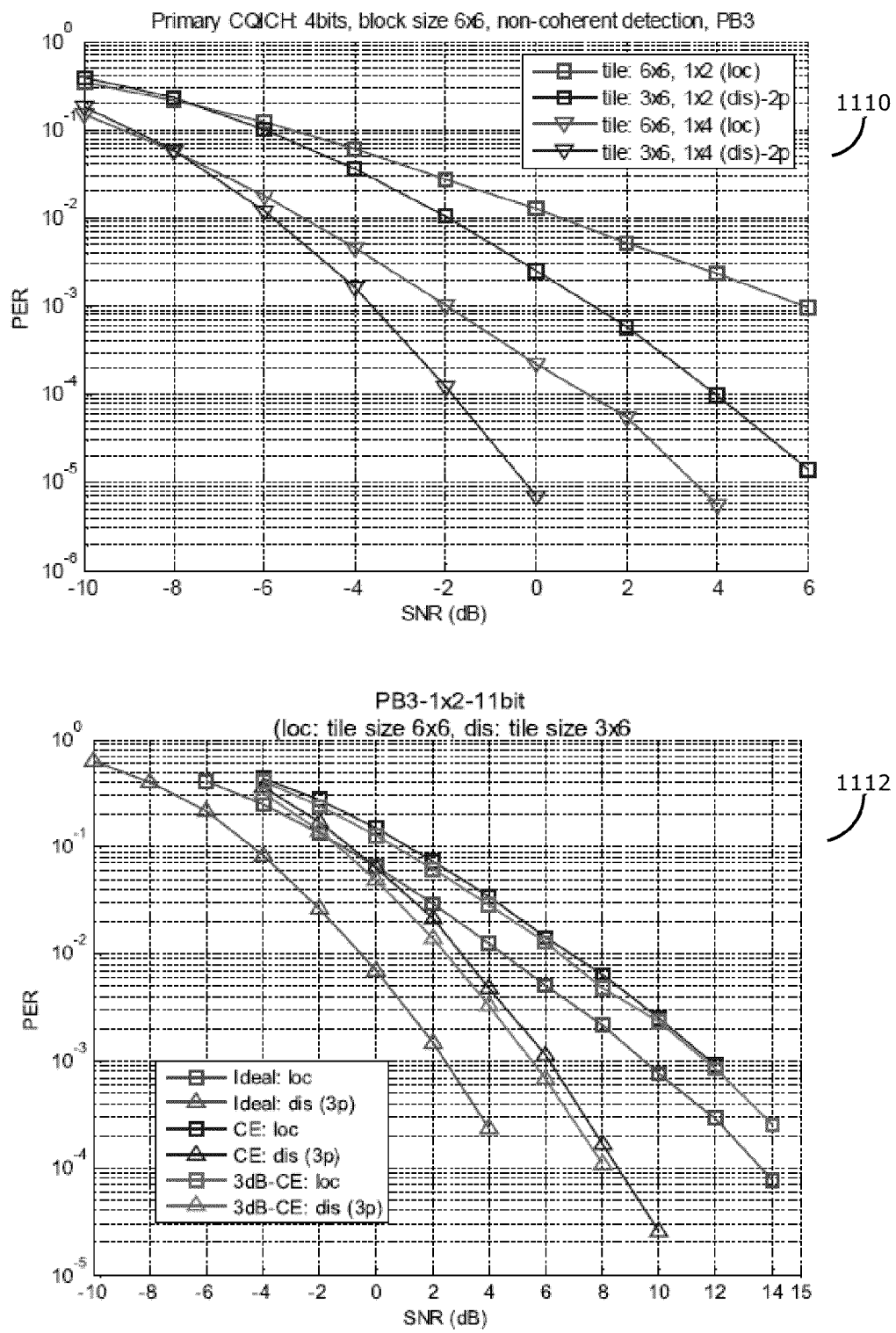
FIG. 11 is diagram illustrating example results for a channel quality feedback system in accordance with one or more embodiments.

Referring now to FIG. 11, a diagram illustrating example results for a channel quality feedback system in accordance with one or more embodiments will be discussed. Based on a simulation platform utilizing an IEEE 802.16m link level simulator (LLS), the performance of different permutation modes was evaluated. Channel models include: International Telecommunication Union (ITU) mobile terminal peak power (PA) 3 kilometers per hour (kmph) and ITU peak transmitter power (PB) 3 kmph and for 4-bits primary fast feedback channel 120 performance evaluation utilizing non-coherent detection. For secondary fast feedback channel 122 related evaluation, mobile link (ML) detection with minimum mean squared error (MMSE) based channel estimation was used. Graph 1110 of FIG. 11 shows that with packet error rate (PER)=10% tile size 6×6 in localized permutation will be slightly better than that of tile size 3×6 in distributed mode while for lower PER, tile size 3×6 will be better than 6×6. Basically the curves with tile size of 3×6 are sharper than that of 6×6, but the difference may be reduced when the antenna number increases. In a practical system, an appropriate tile size may be selected according to the design target of CQI. Table 6, below, lists the signal-to-noise ratio (SNR) in decibels (dB) in different cases to achieve a target PER=1% and 10%.

TABLE 6

SNR (dB) of 4-bits PCQIH for PER = 1% and 10%

| | Tile | 2 RX | | 4 RX | |
|---|---|---|---|---|---|
| Channel Model | Size | PER = 0.1 | PR = 0.01 | PER = 0.1 | PER = 0.01 |
| PB 3 kmph | 6 × 6 | −5.5 | 0.5 | −9.2 | −5.2 |
| | 3 × 6 | −6 | −2 | −8.9 | −5.9 |
| PA 3 kmph | 6 × 6 | −5.7 | 0.3 | −9.3 | −5.3 |
| | 3 × 6 | −5.5 | −0.8 | −8.5 | −5.3 |

With four receiver antennas (4 RX), the SNR may be as low as −8.5 dB indicating the design may be sufficiently robust to for the system to maintain a reliable CQI connection and/or coverage up to a cell size of 5 kilometers (km). Using a tile size of 2×6 for 4/5/6 payload bits for primary fast feedback channel 120, the slope of the curves may be slightly sharper than that of 3×6 due to more frequency diversity gain from repetition 3. Additionally from results under mobile device velocity (VA) 350 kmph indicates enhanced receiver performance for non-coherent detection. Without this, we see EF before getting PER=0.01. Graph 1112 of FIG. 11 shows performance results of 1×2 and 1×4 under PB 3 kmph when transmitting 11 bits payload with block size of 6×6 showing that a tile size 3×6 outperforms a tile size 6×6 about 2 dB at PER=10% and 4 dB at PER=1% when there are 2 receiver antennas, and 1 dB and 2.5 dB respectively in case of 4 receiver antennae. Such a result may be the result of frequency diversity gain, for example a diversity order=2 when using 2 tiles of 3×6, indicating favorable performance with a tile size 3×6 in such a case. It should be noted that FIG. 11 shows example results using performance simulations, and the scope of the claimed subject matter is not limited in this respect. An information handling system utilizing channel quality data feedback is shown in and described with respect to FIG. 12, below.

Figure 12:
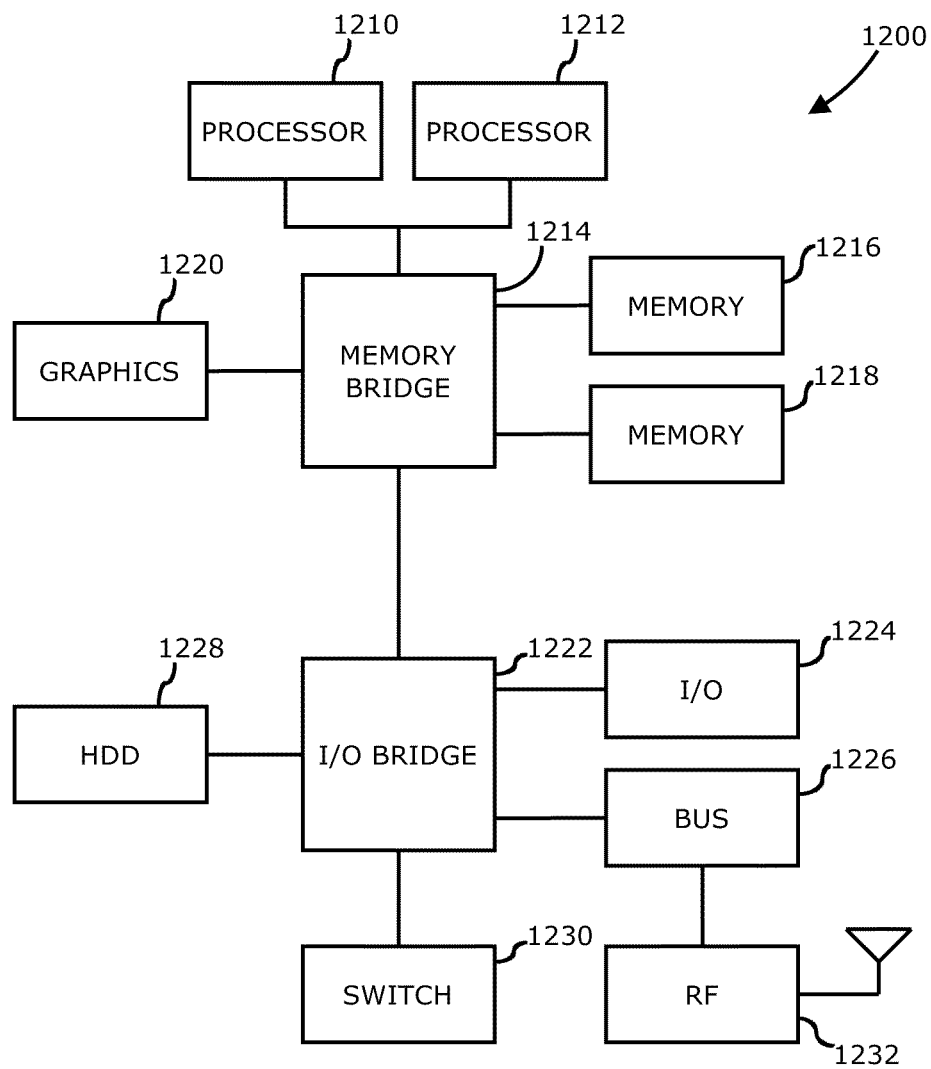
FIG. 12 is a block diagram of an information handling system capable implementing a channel quality feedback system in accordance with one or more embodiments.

Referring now to FIG. 12, a block diagram of an information handling system capable implementing a channel quality feedback system in accordance with one or more embodiments. Information handling system 1200 of FIG. 12 may tangibly embody one or more of any of the network elements of network 200 as shown in and described with respect to FIG. 2. For example, information handling system 1200 may represent the hardware of base station 214 and/or subscriber station 216, with greater or fewer components depending on the hardware specifications of the particular device or network element. Although information handling system 1200 represents one example of several types of computing platforms, information handling system 1200 may include more or fewer elements and/or different arrangements of elements than shown in FIG. 12, and the scope of the claimed subject matter is not limited in these respects.

Information handling system 1200 may comprise one or more processors such as processor 1210 and/or processor 1212, which may comprise one or more processing cores. One or more of processor 1210 and/or processor 1212 may couple to one or more memories 1216 and/or 1218 via memory bridge 1214, which may be disposed external to processors 1210 and/or 1212, or alternatively at least partially disposed within one or more of processors 1210 and/or 1212. Memory 1216 and/or memory 1218 may comprise various types of semiconductor based memory, for example volatile type memory and/or non-volatile type memory. Memory bridge 1214 may couple to a graphics system 1220 to drive a display device (not shown) coupled to information handling system 1200.

Information handling system 1200 may further comprise input/output (I/O) bridge 1222 to couple to various types of I/O systems. I/O system 1224 may comprise, for example, a universal serial bus (USB) type system, an IEEE 1394 type system, or the like, to couple one or more peripheral devices to information handling system 1200. Bus system 1226 may comprise one or more bus systems such as a peripheral component interconnect (PCI) express type bus or the like, to connect one or more peripheral devices to information handling system 1200. A hard disk drive (HDD) controller system 1228 may couple one or more hard disk drives or the like to information handling system, for example Serial ATA type drives or the like, or alternatively a semiconductor based drive comprising flash memory, phase change, and/or chalcogenide type memory or the like. Switch 1230 may be utilized to couple one or more switched devices to I/O bridge 1222, for example Gigabit Ethernet type devices or the like. Furthermore, as shown in FIG. 12, information handling system 1200 may include a radio-frequency (RF) block 1232 comprising RF circuits and devices for wireless communication with other wireless communication devices and/or via wireless networks such as network 200 of FIG. 2, for example where information handling system 1200 embodies base station 214 and/or subscriber station 216, although the scope of the claimed subject matter is not limited in this respect. In one or more embodiments, RF block 1232 may comprise transmitter 110 and/or receiver 114 of FIG. 1, at least in part. Furthermore, at least some portion of transmitter 110 or receiver 114 may be implemented by processor 1210, for example the digital functions of transmitter 110 which may include processing of the baseband and/or quadrature signals, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to transmission of channel quality data in wireless communication systems and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   receiving data transmitted from a transmitter in a downlink channel; and
   feeding back channel quality data back to the transmitter using a feedback arrangement comprising a first uplink channel and a second uplink channel, wherein the first uplink channel comprises a primary channel quality indicator (CQI) channel and the second uplink channel comprises a secondary channel quality indicator (CQI) channel;
   wherein channel quality indicator (CQI) data is fed back periodically via wideband transmission at a lower rate on the first uplink channel and channel quality indicator (CQI) data is fed back on demand via narrowband transmission at a higher rate on the second uplink channel in the event there is a higher amount of data to be fed back;
   said feeding back on the second uplink channel comprising using link adaptation to select a transmission rate for feeding back CQI data on the second uplink channel; and
   wherein the first uplink channel is capable of providing a reference for power controlling the downlink channel and the second uplink channel to achieve a minimum signal-to-interference and noise ratio (SINR) so that a lowest or nearly lowest modulation coding scheme (MCS) level may be supported.

2. A method as claimed in claim 1, further comprising, for the second uplink channel, mapping a coded block into a tile structure by dividing one or more coded blocks into a first number of parts and repeating the mapping for a lower number of information bits, or by dividing or more coded blocks into a second number of parts without repeating for a higher number of information bits.

3. A method as claimed in claim 1, further comprising adapting one or more transmission parameters on the second uplink channel based at least in part on a channel condition of a user and/or an amount of data to be fed back, or combinations thereof, in the second uplink channel.

4. A method as claimed in claim 1, said feeding back on the second uplink channel comprising feeding back effective signal-to-interference and noise ratio per codeword data, transmission rank data, or pre-coding matrix index data, or combinations thereof for at least one of multiple-input, multiple-output communication, fractional frequency reuse, or frequency selective scheduling, or combinations thereof, for said receiving.

5. A method as claimed in claim 1, further comprising estimating a channel correlation based at least in part on a channel delay spread for two or more subcarriers to obtain a Doppler speed, and comparing the Doppler speed to pre-computed values for the channel correlation for two or more speeds.

6. A method as claimed in claim 1, wherein the transmission rate is selected based at least in part on a channel condition or a user location or combinations thereof.

7. A method as claimed in claim 1, wherein users having a higher signal-to-interference and noise ratio may transmit channel quality indicators at higher rates, and wherein the second uplink channel is turned off if there is no data to transmit within a predetermined number of frames.

8. A method as claimed in claim 1, said feeding back on the first uplink channel or on the second uplink channel, or combinations thereof, comprising selecting a frequency versus subcarrier tile structure based at least in part on a permutation mode of the respective first uplink channel or second uplink channel, or interlacing one or more pilot signals in the tile structure to facilitate channel measurement for the first uplink channel or the second uplink channel, or combinations thereof.

9. A method as claimed in claim 1, further comprising using a semi-orthogonal sequence to encode data in the first uplink channel.

10. A method as claimed in claim 1, further comprising, for the second uplink channel, encoding payload data into a variable size block as a function of a format of the feedback information, wherein payload data less than or equal to a predetermined size is encoded to a first number of bits using a linear block code, and payload data greater than the predetermined size is encoded by repeating two or more blocks of a second number of number of bits using linear block codes.

11. A method, comprising:
transmitting data to a receiver in a downlink channel;
receiving channel quality data back from the receiver using a feedback arrangement comprising a first uplink channel and a second uplink channel, wherein the first uplink channel comprises a primary channel quality indicator (CQI) channel and the second uplink channel comprises a secondary channel quality indicator (CQI) channel;
wherein channel quality indicator (CQI) data is received periodically via wideband transmission at a lower rate on the first uplink channel and channel quality indicator (CQI) data is received on demand via narrowband transmission at a higher rate on the second uplink channel in the event there is a higher amount of data to be fed back; and
said receiving in the second uplink channel comprising using link adaptation to select a transmission rate for receiving CQI data feedback on the second uplink channel;
wherein the first uplink channel is capable of providing a reference for power controlling the downlink channel and the second uplink channel to achieve a minimum signal-to-interference and noise ratio (SINR) so that a lowest or nearly lowest modulation coding scheme (MCS) level may be supported.

12. A method as claimed in claim 11, further comprising further comprising, for the second uplink channel, decoding a coded block mapped into a tile structure by dividing one or more coded blocks into a first number of parts and repeating the mapping for a lower number of information bits, or by dividing or more coded blocks into a second number of parts without repeating for a higher number of information bits.

13. A method as claimed in claim 11, said receiving comprising receiving data on the second uplink channel based at least via one or more transmission parameters adapted based at least in part on a channel condition of a user or an amount of data to be fed back, or combinations thereof, in the second uplink channel.

14. A method as claimed in claim 11, further comprising estimating a channel correlation based at least in part on a channel delay spread for two or more subcarriers to obtain a Doppler speed, and comparing the Doppler speed to precomputed values for the channel correlation for two or more speeds.

15. A method as claimed in claim 11, said receiving on the second uplink channel comprising receiving effective signal-to-interference and noise ratio per codeword data, transmission rank data, or pre-coding matrix index data, or combinations thereof for at least one of multiple-input, multiple-output communication, fractional frequency reuse, or frequency selective scheduling, or combinations thereof based at least in part on data received in the second uplink channel.

16. A method as claimed in claim 11, wherein the transmission rate is selected based at least in part on a channel condition or a user location or combinations thereof.

17. A method as claimed in claim 11, wherein users having a higher signal-to-interference and noise ratio may transmit channel quality indicators at higher rates, a and wherein the uplink channel is turned off if there is no data to transmit within a predetermined number of frames.

18. A method as claimed in claim 11, said receiving on the first uplink channel or on the second uplink channel, or combinations thereof, comprising receiving data via a frequency versus subcarrier tile structure selected based at least in part on a permutation mode of the respective first uplink channel or second uplink channel, or receiving one or more pilot signals in the tile structure to facilitate channel measurement for the first uplink channel or the second uplink channel, or combinations thereof.

19. A method as claimed in claim 11, further comprising using a semi-orthogonal sequence to decode data in the first uplink channel.

20. A method as claimed in claim 11, further comprising, for the second uplink channel, decoding payload data encoded into a variable size block as a function of a format of the feedback information, wherein payload data less than or equal to a predetermined size as encoded to a first number of bits using a linear block code, and payload data greater than the predetermined size was encoded by repeating two or more blocks of a second number of number of bits using linear block codes.

21. An apparatus, comprising:
a baseband processor and a radio-frequency transceiver coupled to the baseband processor, wherein the baseband processor is configured to:
receive data transmitted from a transmitter in a downlink channel;
feed back channel quality data back to the transmitter using a feedback arrangement comprising a first uplink channel and a second uplink channel, wherein the first uplink channel comprises a primary channel quality indicator (CQI) channel and the second uplink channel comprises a secondary channel quality indicator (CQI) channel;
wherein channel quality indicator (CQI) data is fed back periodically via wideband transmission at a lower rate on the first uplink channel and channel quality indicator (CQI) data is fed back on demand via narrowband transmission at a higher rate on the second uplink channel in the event there is a higher amount of data to be feedback;
wherein feedback on the second uplink channel utilizes link adaptation to select a transmission rate for feeding back CQI data on the second uplink channel; and
wherein the first uplink channel is capable of providing a reference for power controlling the downlink channel and the second uplink channel to achieve a minimum signal-to-interference and noise ratio (SINR) so that a lowest or nearly lowest modulation coding scheme (MCS) level may be supported.

22. A method as claimed in claim 11, further comprising allocating one or more resources for the first uplink channel or the second uplink channel based at least in part on the channel quality data received in said receiving.

23. An apparatus as claimed in claim 22, wherein the baseband processor is further configured to:
- for the second uplink channel, map a coded block into a tile structure by dividing one or more coded blocks into a first number of parts and repeating the mapping for a lower number of information bits, or by dividing or more coded blocks into a second number of parts without repeating for a higher number of information bits.

\* \* \* \* \*